United States Patent
Minakuchi et al.

(10) Patent No.: US 7,233,988 B2
(45) Date of Patent: Jun. 19, 2007

(54) DATA COMMUNICATION DEVICE AND METHOD OF PROCESSING TRANSMITTED DATA

(75) Inventors: Mitsuru Minakuchi, Kyoto (JP); Masafumi Hirata, Tenri (JP); Tadahide Shibao, Takaishi (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 751 days.

(21) Appl. No.: 09/725,290

(22) Filed: Nov. 29, 2000

(65) Prior Publication Data

US 2001/0002365 A1    May 31, 2001

(30) Foreign Application Priority Data

Nov. 30, 1999 (JP) ............................. 11-339009
Nov. 15, 2000 (JP) ............................. 2000-348072

(51) Int. Cl.
*G06F 15/173*  (2006.01)
*G06F 15/16*   (2006.01)

(52) U.S. Cl. .................. 709/224; 709/213; 709/223; 709/246

(58) Field of Classification Search ............. 709/212, 709/213–219, 223–224, 229, 231, 232, 238, 709/242, 203, 248, 246
See application file for complete search history.

(56) References Cited

U.S. PATENT DOCUMENTS

| | | | |
|---|---|---|---|
| 5,572,646 A | 11/1996 | Kawai et al. | 345/501 |
| 5,580,308 A | 12/1996 | Nakamura | 463/7 |
| 5,754,740 A | 5/1998 | Fukuoka et al. | 706/5 |
| 5,802,296 A * | 9/1998 | Morse et al. | 709/208 |
| 5,951,636 A * | 9/1999 | Zerber | 709/202 |
| 5,956,501 A | 9/1999 | Brown | 345/501 |
| 5,966,526 A | 10/1999 | Yokoi | 463/7 |
| 5,971,855 A | 10/1999 | Ng | 706/58 |
| 5,982,390 A | 11/1999 | Stoneking et al. | 703/11 |
| 6,020,892 A | 2/2000 | Dillon | 703/11 |
| 6,048,209 A | 4/2000 | Bailey | 345/474 |
| 6,056,618 A | 5/2000 | Larian | 345/419 |
| 6,141,019 A | 10/2000 | Roseborough et al. | 434/217 |
| 6,167,362 A | 12/2000 | Brown et al. | 446/73 |
| 6,171,189 B1 | 1/2001 | Katano et al. | 345/473 |
| 6,175,857 B1 | 1/2001 | Hachiya et al. | 703/11 |
| 6,192,410 B1 * | 2/2001 | Miller et al. | 709/232 |

(Continued)

OTHER PUBLICATIONS

Honda et al., Journal of the Institute of Electronics Information and Communication Engineers, vol. 82, No. 4, pp. 386-390 (1999).

*Primary Examiner*—Ario Etienne
*Assistant Examiner*—Hussein El-chanti
(74) *Attorney, Agent, or Firm*—Birch, Stewart, Kolasch & Birch, LLP

(57) ABSTRACT

A data communication device for data communication through radio among a plurality of devices includes a reception circuit receiving data, a storage circuit connected to the reception circuit to store received data, a transmission circuit connected to the storage circuit to search for one data communication device capable of communication therewith, and transmitting the data stored in the storage circuit into the found data communication device, and a control unit connected to the storage circuit, controlling the storage circuit to delete the data transmitted to the found data communication device in response to receiving reception complete data representing reception of data from the found data communication device.

54 Claims, 38 Drawing Sheets

U.S. PATENT DOCUMENTS

| | | | |
|---|---|---|---|
| 6,213,871 B1 | 4/2001 | Yokoi | 463/43 |
| 6,227,966 B1 | 5/2001 | Yokoi | 709/206 |
| 6,240,393 B1 | 5/2001 | Brown | 463/7 |
| 6,249,780 B1 | 6/2001 | Mizokawa | 413/1 |
| 6,251,010 B1 | 6/2001 | Tajiri et al. | 705/1 |
| 6,251,012 B1 | 6/2001 | Horigami et al. | 706/23 |
| 6,253,167 B1 * | 6/2001 | Matsuda et al. | 703/11 |
| 6,267,677 B1 | 7/2001 | Tajiri et al. | 463/43 |
| 6,268,872 B1 * | 7/2001 | Matsuda et al. | 345/473 |
| 6,273,815 B1 | 8/2001 | Stuckman et al. | 463/9 |
| 6,278,985 B1 | 8/2001 | Hatayama | 706/20 |
| 6,287,193 B1 | 9/2001 | Rehkemper et al. | 463/1 |
| 6,287,200 B1 | 9/2001 | Sharma | 463/40 |
| 6,290,565 B1 | 9/2001 | Galyean III, et al. | 446/99 |
| 6,292,198 B1 | 9/2001 | Matsuda et al. | 345/473 |
| 6,313,843 B1 | 11/2001 | Tanii et al. | 345/473 |
| 6,349,301 B1 * | 2/2002 | Mitchell et al. | 707/101 |
| 6,704,784 B2 * | 3/2004 | Matsuda et al. | 709/224 |
| 6,772,195 B1 * | 8/2004 | Hatlelid et al. | 709/204 |

* cited by examiner

FIG.5

501 HEADER:
- DATA ID
  - (TRANSMITTER ID + TRANSMISSION NUMBER ID)
- DATA SIZE
- DATA CREATION DATE
- DATA UPDATE DATE
- NUMBER OF TRANSMISSIONS AMONG APPARATUS
- DATA EXPIRATION DATE
- NUMBER OF DATA VALID TRANSMISSIONS
- DESTINATION TERMINAL ID
- LIST OF TERMINAL ID RECENTLY DROPPED

502 DATA BODY:
- MAIN DATA
- NUMBER OF APPENDIX DATA
- DATA SIZE
- APPLICATION DEPENDENT DATA
  - APPENDIX DATA DISPLAY CONDITION
  - MISCELLANEOUS
- APPENDIX DATA 1
- APPLICATION DEPENDENT DATA
- APPENDIX DATA 2
- APPLICATION DEPENDENT DATA

DATA COMMUNICATION DEVICE AND METHOD OF PROCESSING TRANSMITTED DATA

BACKGROUND OF THE INVENTION

1. Field of the Invention

The present invention relates to the technique of data communication, particularly to the technique of data communication among a plurality of apparatuses.

2. Description of the Background Art

The development of portable communication apparatuses such as the portable telephone, PHS (Personal Handy-Phone System) and PDA (Personal Digital Assistant) is notable these few years. In accordance with development of these communication apparatuses, intercommunication of the same data among a plurality of communication apparatuses is now carried out.

As the technology related to such data communication, infocast (Journal of The Institute of Electronics Information and Communication Engineers Vol. 82, No. 4, pp. 386-390, April 1999) is known. This communication technique allows the same data to be diffused among a plurality of communication apparatuses as in the game of Chinese whispers by repeating the process of transmitting the data received by a communication apparatus to another communication apparatus.

In a communication system employing the aforementioned communication technique, one data is transmitted to a plurality of communication apparatuses so that a duplicate of one data will exist in many communication apparatuses. In the case where, for example, the communication data corresponds to data of a virtual pet in such a communication system, there will be duplicates of data of the virtual pet in a plurality of communication apparatuses. Therefore, the operation of moving data of a virtual pet around the communication system similar to the moving action of a pet in the real world cannot be realized. In other words, data of a virtual pet cannot be moved from one communication apparatus to another communication apparatus, and then further from that communication apparatus to another communication apparatus.

In the case where one communication apparatus is to be extracted from a plurality of data communication apparatuses by identifying the transmitted data, the aforementioned communication technique will not allow the extraction of one communication apparatus since duplicates of the same one data are respectively present in the plurality of communication apparatuses.

SUMMARY OF THE INVENTION

An object of the present invention is to provide, in the event of data communication among a plurality of communication devices, a data communication device and method that can prevent data diffusion.

Another object of the present invention is to provide, in the event of data communication among a plurality of communication devices, a data communication device and method that can reliably prevent data diffusions.

A further object of the present invention is to provide, in the event of data communication among a plurality of communication devices, a data communication device and method that can reliably carry out transmission and reception.

Still another object of the present invention is to provide, in the event of data communication among a plurality of communication devices, a data communication device and method that prevents a communication device from receiving repeatedly the same data.

A still further object of the present invention is to provide a data communication device and method having operation controlled according to the communication history of received data.

Yet a further object of the present invention is to provide a data communication device and method that can transmit data through an unpredictable communication path.

According to an aspect of the present invention, a data communication device effects data communication among a plurality of devices. The data communication device includes a reception circuit receiving data, a storage circuit connected to the reception circuit to store received data, a transmission circuit searching for one data communication device capable of communication therewith and transmitting the data stored in the storage circuit to the one found data communication device, and a control unit controlling the storage circuit so that data transmitted to the found data communication device is deleted from the storage circuit.

The transmission circuit searches for one data communication device capable of communication therewith. Upon finding one data communication device capable of communication as a result of the search, the data stored in the storage circuit is transmitted to that data communication device. The data transmitted to the found data communication device is deleted from the storage circuit by the control unit.

Further preferably, the control unit controls the reception circuit so that reception complete data representing reception of data is received from the found data communication device. The control unit responds to reception of the reception complete data to control the storage circuit so that the data transmitted to the found data communication device is deleted.

Since the data stored in the storage circuit is deleted in response to reception of reception complete data, only the transmitted data can be deleted reliably.

Further preferably, the data communication device further includes a transmission circuit transmitting inquiry data inquiring about whether data reception is possible or not to the found data communication device prior to transmitting data based on a predetermined condition. The control unit responds to reception of inquiry data to control the reception circuit so as to prepare for data reception.

Since preparation of data reception is made based on the inquiry data transmitted from the reception side, the data can be received reliably.

Further preferably, the data communication device further includes an identification data storage circuit storing identification data to identify itself. The data may be received by the reception circuit through a plurality of data communication devices. The inquiry data includes a plurality of identification data to identify the data communication device through which data has passed before the data arrives at the data communication device transmitting the inquiry data. The control unit includes a circuit rejecting reception of data when the identification data stored in the identification data storage circuit is included in the identification data in the received inquiry data.

Since data reception is rejected when identification data identifying itself is present in the plurality of identification data to identify the data communication devices through which the data has passed before the arrival of data, i.e., when that data has been received in the past, the same data will not be received repeatedly.

Further preferably, the data includes appendix data representing a virtual character. The data communication device further includes a display circuit displaying a virtual character represented by the appendix data, and a modify circuit modifying the appendix data so as to change the virtual character displayed at the display circuit.

The display circuit displays a virtual character represented by the appendix data included in the data received by the reception circuit. The modify circuit can alter the virtual character.

Further preferably, the data includes, in addition to the appendix data, history data representing the data communication device through which data has passed before the data arrives at the data communication device transmitting the inquiry data. The modify circuit includes a circuit modifying the appendix data according to the history data.

The modify circuit modifies appendix data according to the history data representing the data communication device through which data has passed before the data arrives at the communication device. Therefore, the virtual character to be displayed can be altered.

According to another aspect of the present invention, a data communication method carries out data communication among a plurality of data communication devices. The data communication method includes the steps of receiving data, storing the data received at the step of receiving data, searching for one data communication device capable of communication therewith, transmitting data stored in the step of storing data to the data communication device found at the step of searching for a data communication device, and deleting the data transmitted to the found data communication device.

The step of transmitting data includes searching for one data communication device capable of communication therewith. When a data communication device capable of communication is found as a result of the search, the stored data is transmitted to that data communication device. In the step of deleting data, the data transmitted to the found data communication device is deleted.

According to a further aspect of the present invention, a computer-readable recording medium is recorded with a program realizing a data communication method carrying out data communication among a plurality of data communication devices. The data communication method includes the steps of receiving data, storing data received at the step of receiving data, searching for one data communication device capable of communication therewith, transmitting data stored at the step of storing data to the data communication device found in the step of searching for a data communication device, and deleting the data transmitted to the found data communication device.

The step of transmitting data includes the step of searching for one data communication device capable of communication therewith. When a data communication device capable of communication is found as a result of the search, the stored data is transmitted to that data communication device. At the step of deleting data, the data transmitted to the found data communication device is deleted.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a data format of transmitted data.

DESCRIPTION OF THE PREFERRED EMBODIMENTS

Figure 1:
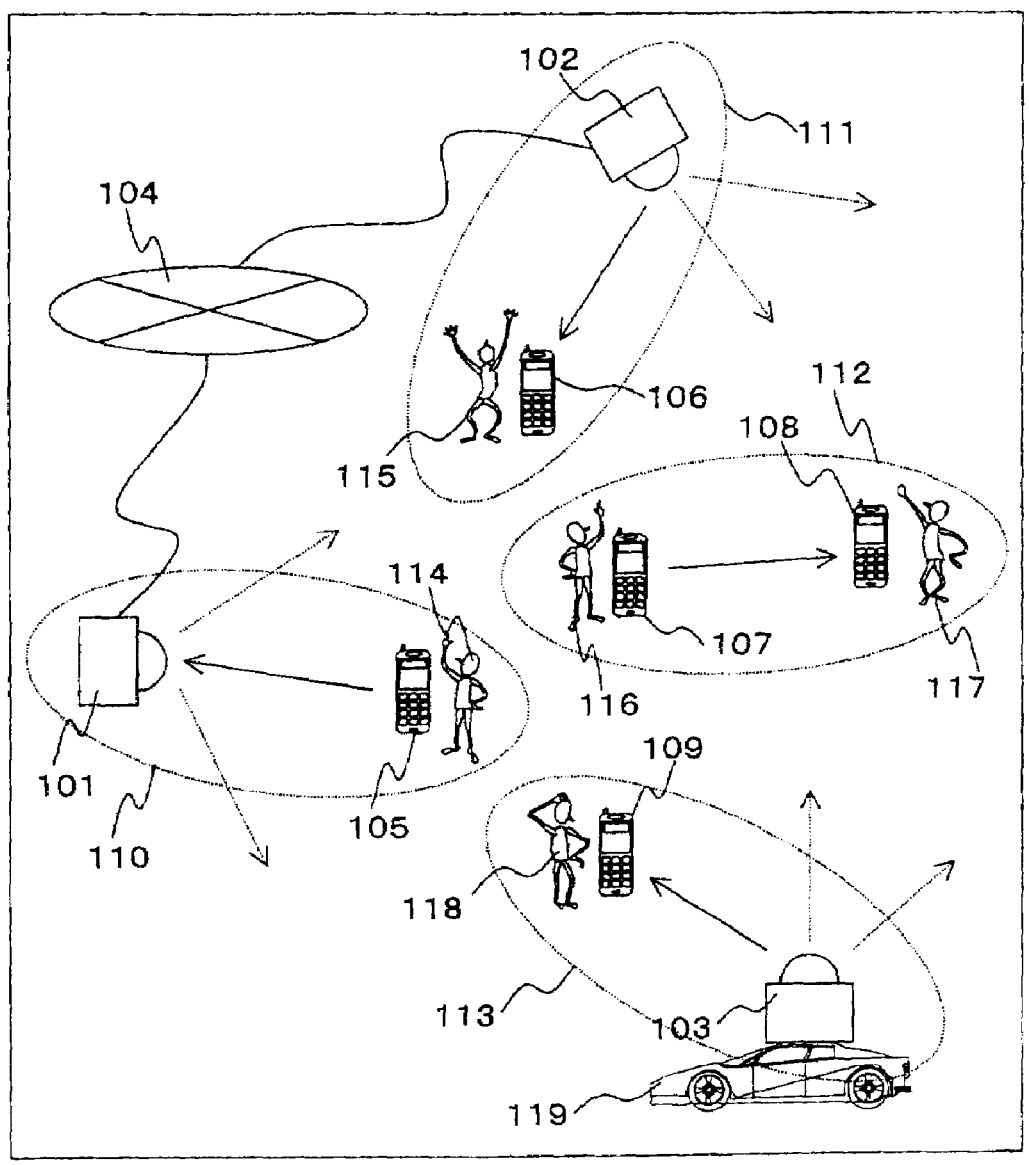
FIG. 1 shows a data communication system using a data communication device according to the present invention.

Embodiments of the present invention will be described hereinafter with reference to the drawings. In the drawings, the same parts have the same reference characters allotted. Their label and function are the same. Therefore, detailed description thereof will not be repeated where appropriate.

First Embodiment

FIG. 1 schematically shows a data communication system using a data communication method according to the present invention. The data communication system includes a plurality of data communication apparatuses that can execute the data communication method of the present invention. In the description below, the data communication apparatus that can execute the data communication method of the present invention includes a data communication device and a data communication terminal. The data communication device is a data communication apparatus that can execute the data communication method of the present invention, envisaged to be installed fixedly to a building, a vehicle, or the like. The data communication terminal is a data communication apparatus that can execute the data communication method of the present invention, compact in size and envisaged to be carried by an individual.

The present embodiment is explained here with reference to FIG. 1.

Data communication devices 101, 102 and 103 are installed to a fixture such as a building, an advertising display board, an automatic vending machine or the like, or installed to a mobile such as a vehicle, a bus, or the like, to provide data. Each of data communication terminals 105, 106, 107, 108 and 109 is a portable telephone, PHS, PDA or the like that can execute the data communication method of the present invention.

The data communication device is connected to a network 104 such as the Internet to receive data transmitted through network 104. A data communication device can receive data from a data communication terminal to transmit the received data to another data communication device through network 104, and the data can be transmitted from that data communication device to another data communication terminal.

Data communication devices 101 and 102 are fixed in their installed location, and connected to each other via network 104.

A range 110 represented by an ellipse is the range where communication is allowed between data communication device 101 and data communication terminal 105. Here, data is transmitted from data communication terminal 105 to data communication device 101.

Data communication device 101 transmits the received data to data communication device 102 via network 104. The data can be transmitted therefrom to another data communication terminal 106.

A range 111 represented by an ellipse is the range where communication is allowed between data communication device 102 and data communication terminal 106. Here, data is transmitted from data communication device 102 to data communication terminal 106.

Data communication device 102 can receive through network 104 data transmitted from itself to another data communication terminal 106.

A range 113 represented by an ellipse is the range where communication is allowed between data communication device 103 and data communication terminal 109. Here, data is transmitted from data communication device 103 to data communication terminal 109.

Data communication device 103 is installed to a vehicle 119 to transmit data to another data communication device 109.

A range 112 represented by an ellipse is the range where communication is allowed between data communication terminal 107 and data communication terminal 108. Here, data is transmitted from data communication terminal 107 to data communication terminal 108.

Data communication terminals 105, 106, 107, 108 and 109 are owned by individuals 114, 115, 116, 117 and 118, respectively. A data communication system is built dynamically by these moving individuals each carrying a data communication terminal and carrying out data transmission/reception with another data communication device or data communication terminal that is newly in close proximity.

Communication Between Apparatuses

Figure 2:
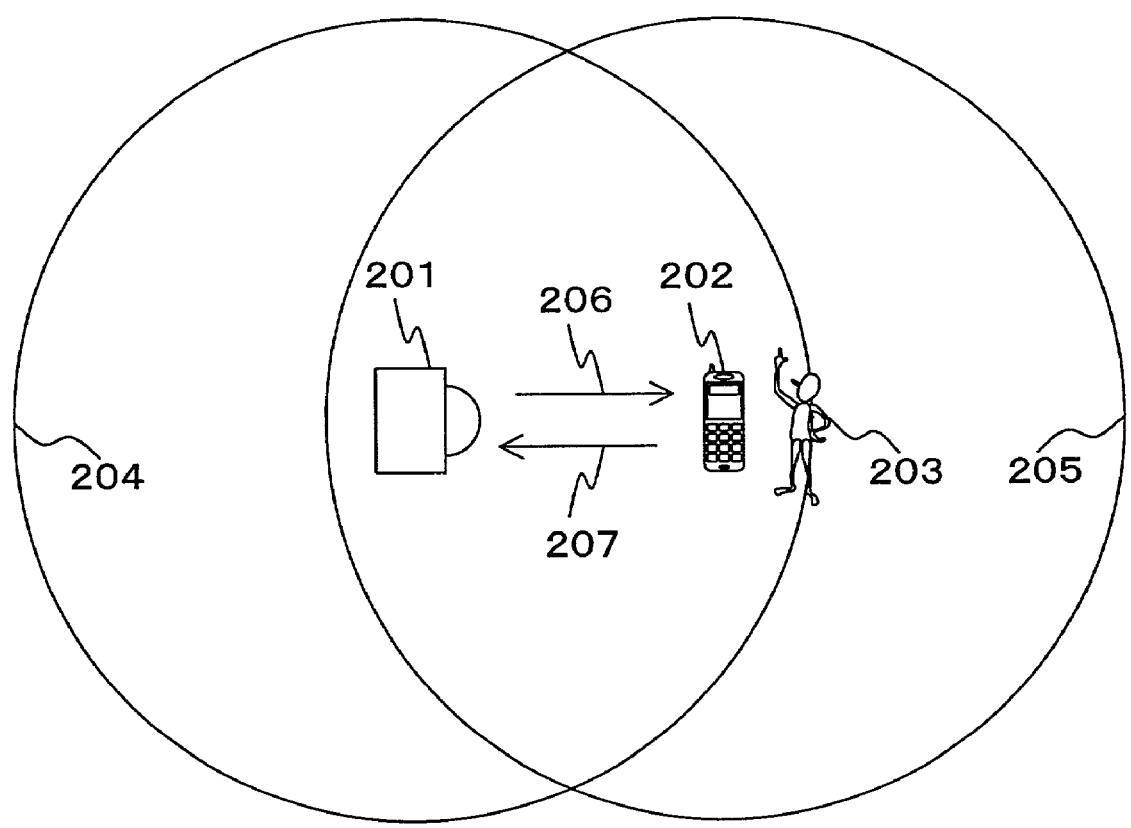
FIG. 2 is a diagram to describe data communication between a data communication device and a data communication terminal according to a data communication method of the present invention.

FIG. 2 schematically shows data communication carried out between a data communication device and a data communication terminal that can execute the data communication method of the present invention.

A range 204 represented by a circle is the range where communication between data communication device 201 and another data communication device or a data communication terminal is allowed by the data communication method of the present invention. A range 205 represented by a circle is the range where communication between data communication terminal 202 and another data communication terminal or a data communication device is allowed by the data communication method of the present invention. FIG. 2 corresponds to the case where communication is carried out between a data communication device and a data communication terminal.

As mentioned above, data communication terminal 202 is a portable telephone, PHS, PDA or the like that can execute the data communication method of the present invention. Data communication terminal 202 is owned by an individual 203.

When data communication terminal 202 enters range 204 where communication with data communication device 201 is allowed, and also into range 205 where communication with data communication terminal 202 is allowed, communication according to the data communication method of the present invention is allowed therebetween.

Data communication device 201 is a device that carries out only data transmission, only data reception, or both transmission and reception with respect to a data communication terminal or another data communication device. In the case of a device that carries out only data transmission, the data to be transmitted is received from network 104. In the case of a device that carries out only data reception, the received data is transmitted to another data communication device connected to network 104. The direction of data communication for data communication device 201 corresponds to arrow 206 when only data transmission is carried out, to arrow 207 when only data reception is to be carried out, and to both arrows 206 and 207 when data transmission and reception are carried out. It is to be noted that communication may not be carried out even when both the data communication device and the data communication terminal are in a communication allowed range depending upon the operation mode of the data communication device and the data communication terminal.

Figure 3:
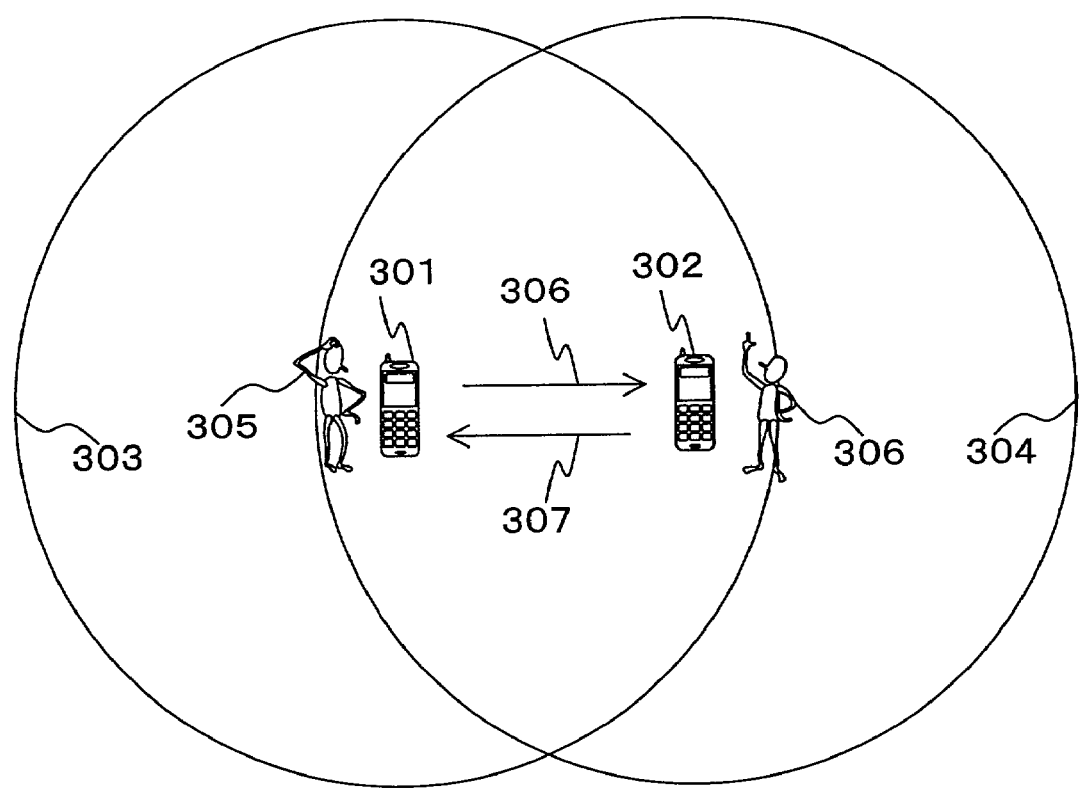
FIG. 3 is a diagram to describe data communication between data communication terminals according to a data communication method of the present invention.

FIG. 3 schematically shows data communication carried out between data communication terminals that can execute the data communication method of the present invention.

A range 303 represented by a circle is the range where communication between data communication terminal 301 and a data communication device or another data communication terminal is allowed according to the data communication method of the present invention. A range 304 represented by a circle is the range where communication is allowed between data communication terminal 302 and a data communication device or another data communication terminal according to the data communication method of the present invention. FIG. 3 corresponds to communication between a data communication terminal and another data communication terminal.

Data communication terminals 301 and 302 are owned by individuals 305 and 306, respectively.

Referring to FIG. 3, when data communication terminal 302 enters range 303 where communication with data communication terminal 301 is allowed and data communication terminal 301 enters range 304 where communication with data communication terminal 302 is allowed, communication according to the data communication method of the present invention can be carried out therebetween.

Each of data communication terminals 301 and 302 has the two operation modes of a transmission mode and a reception mode. Switching is effected between these two modes by a method that will be described afterwards. In the case of FIG. 3, the data communication direction corresponds to the directions of arrows 306 and 307. Communication may not be carried out even when both data communication terminals are in a communication allowed range depending upon the operation mode of respective data communication terminals.

The data communication method of the present invention is not limited to communication through radio. Communication through wire can be implemented. In this case, a data communication terminal is connected to a data communication device or another data communication terminal through wire according to the data communication method of the present invention. The data communication terminal initiates transmission/reception of data when attaining a state capable of communication. For example, TCP/IP (Transmission Control Protocol/Internet Protocol) which is a standard communication protocol can detect a state in which communication to transmit/receive data is allowed. When the data communication terminal transmits a packet including a plurality of IP (Internet Protocol) addresses and then receives a packet from an IP address corresponding to one of the transmitted IP address, determination is made that communication with the communication terminal transmitting that packet is allowed. Then, data transmission/reception is initiated.

Figure 4:
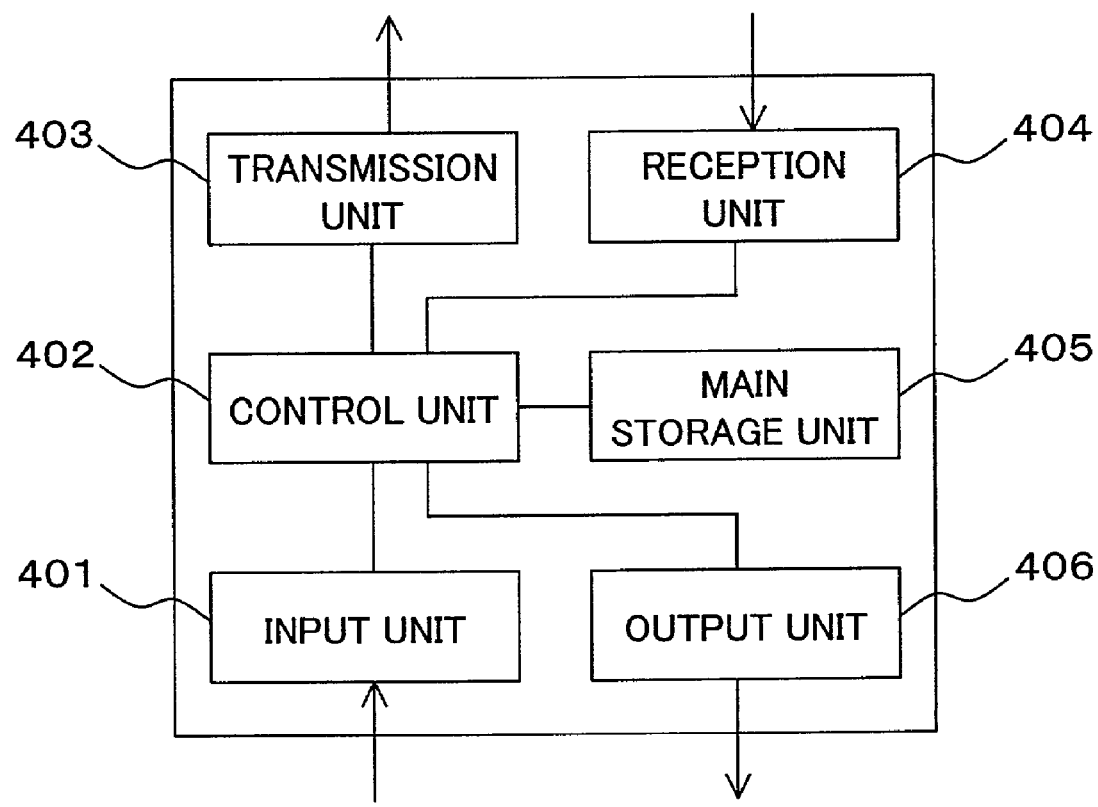
FIG. 4 is a block diagram of a data communication device and a data communication terminal of the present invention.

Data communication device and data communication terminal FIG. 4 is a block diagram of a data communication device and a data communication terminal. The block diagram of a data communication device is basically identical to that of a data communication terminal. A data communication device that has only the transmission function corresponds to the block that will be described hereinafter lacking the parts related to reception. Similarly, a data communication device that has only the reception function corresponds to the block that will be described hereinafter lacking the parts related to transmission.

An input unit 401 includes a device into which a signal or the like representing designation with respect to a data communication device or a data communication terminal is input by an individual. Input unit 401 converts the input signal into a predetermined format to transmit the converted signal to a control unit 402. The device to input a signal or the like includes a pointing device such as a keyboard or a mouse, the ten-key of a telephone device or the like, SUI (Solid User Interface) such as a hard button, GUI (Graphical User Interface) displayed on a liquid crystal display or the like, a touch panel, a microphone, and the like. An appropriate device is selected therefrom according to the size, function and the like of the data communication device or data communication terminal of the present invention.

Control unit 402 executes the data communication method of the present invention. Control unit 402 provides control of a transmission unit 403, a reception unit 404, a main storage unit 405, and an output unit 406 according to a signal input through input unit 401.

Transmission unit 403 includes a device transmitting data to another data communication device or data communication terminal through wire or radio. Transmission unit 403 is under control of control unit 402. The device to transmit data through radio includes a device transmitting data by means of light such as infrared, a device transmitting data by means of a wave, or the like. An appropriate device is selected therefrom based on the size, function, and the like of the data communication device or data communication terminal of the present invention.

Reception unit 404 includes a device receiving data through wire or radio from another data communication device or a data communication terminal. Reception unit 404 is under control of control unit 402. The device receiving data through radio includes a device receiving data by means of light such as infrared, a device receiving data by means of a wave, or the like. An appropriate device is selected therefrom based on the size, function, and the like of the data communication device or data communication terminal of the present invention. In practice, a device corresponding to the device employed as transmission unit 403 is selected.

Data that is the subject of communication, and the program and data to drive the data communication device and the data communication terminal are stored in main storage unit 405. Data is read in, written, erased, or the like with respect to main storage unit 405 by control unit 402.

Output unit 406 includes a device to provide a signal or the like of an operation status to an individual. Output unit 406 is under control of control unit 402. The device to output the signal or the like includes a CRT (Cathode Ray Tube), liquid crystal display device, light emitting diode, button light, speaker, vibration device, or the like. An appropriate device is selected therefrom based on the size, function, and the like of the data communication device or data communication terminal according to the present invention.

Data Format

Data handled in the data communication method of the present invention will be described here.

FIG. 5 represents the format of data handled in the data communication method of the present invention. The data is formed of two portions, i.e., a header 501 and a data body 502.

The header includes a data ID (identification), data size, data creation date, data update date, number of transmissions among apparatuses, data expiration date, number of data valid transmissions, destination apparatus ID, and a list of the IDs of apparatuses recently dropped in.

An identifier of the data handled by the data communication method of the present invention is stored in data ID. All data is assigned a data ID distinguishing its own data from another data. The data ID is formed of a transmitter ID and a transmission number ID.

The transmitter ID identifies uniquely a data communication device or a data communication terminal that has first sent the data. It is assumed that each data communication device and data communication terminal is assigned a different apparatus ID.

The transmission number ID is applied at the data communication device or the data communication terminal that has first sent the data. A different ID is applied to the data sent from the same data communication device and data communication terminal.

The size of the header and the size of the data body are stored in the data size.

The date when the data is first transmitted is stored in the data creation date.

The date of the last update of data is stored in the data update date.

The number of times the data has been transmitted through a data communication device and data communication terminal is stored in the number of transmissions among apparatuses.

The date of the termination of the data valid period is stored in data expiration date. The data is deleted at the expiration of this date. This expiration date may be set rewritable through an operation of a user.

The number of transmissions corresponding to valid data is stored in the number of data valid transmissions. Data is deleted when the number of transmissions among apparatuses exceeds this number of data valid transmissions. The number of data valid transmissions may be set rewritable through an operation of a user.

When the destination of the data is specified, the ID of that reception apparatus is stored in destination apparatus ID. The data destination is input through input unit 401. Dummy data is stored when the destination is not set.

The IDs of a predetermined number of communication apparatuses such as the ID of the current data communication device or the data communication terminal with the data, the ID of the immediately preceding data communication device or the data communication terminal with the data, and the ID of the second preceding data communication device or the data communication terminal with the data, etc. are stored in the ID list of apparatuses recently dropped in.

The data body includes main data and appendix data appended, as necessary. Main data includes the number of appendix data, data size, and application dependent data.

The number of appendix data appended to the data body is stored as the number of appendix data. The size of main data and the size of each appendix data are stored in the data size. Application dependent data depends on the application realized by the data communication method of the present invention, and includes data related to the handling of appendix data. When the application corresponds to virtual pet data, application dependent data includes data representing the status of a virtual pet, bit map data to display the virtual pet graphically, and the like.

Data depending on the application realized using the data communication method of the present invention is stored in the appendix data.

Figure 6:
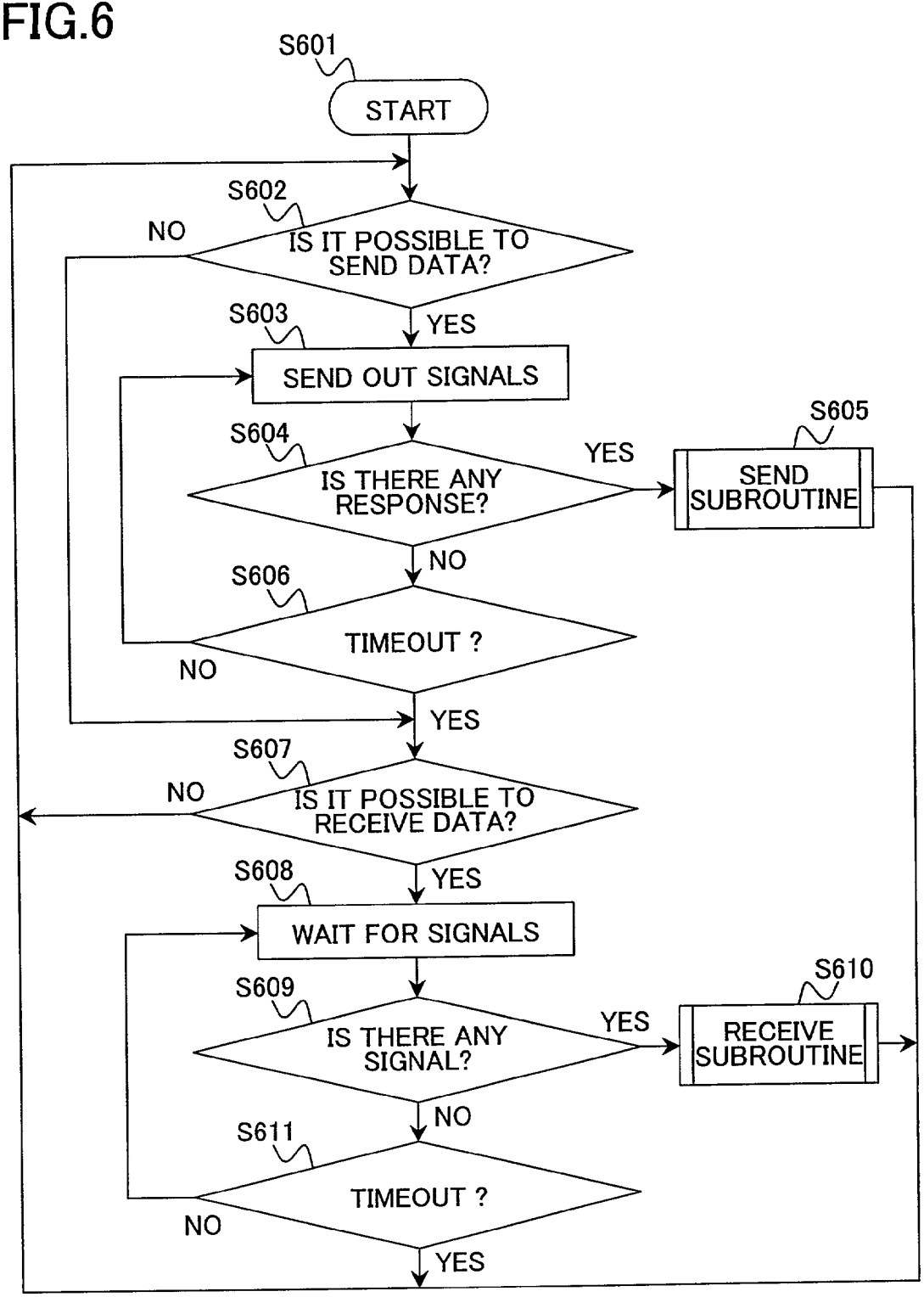
FIG. 6 is a flow chart schematically representing a process in a data communication device (capable of transmission and reception) of the present invention.

The control flow of the program executed by the data communication device and the data communication terminal of the present invention will be described hereinafter with reference to flow charts. Transmission and reception mode switch process of the data communication device FIG. 6 is a flow chart representing a control flow of the process for a data communication device including both a transmission mode and a reception mode to switch between these two modes.

At step (abbreviated as "S" hereinafter) 601, the power of the data communication device is turned on to initiate the process.

At S602, control unit 402 determines whether the data communication device can transmit data to another data communication device or a data communication terminal. This determination is based on, for example, whether data to be transmitted is stored in main storage unit 405 or not. If data transmission is possible (YES at S602), the process proceeds to S603. If data transmission is not possible (NO at S602), the process proceeds to S607.

At S603, control unit 402 transmits an announce signal to notify the data communication device and the data communication terminal capable of data reception the presence of the present device.

At S604, control unit 402 determines whether there is a response to the announce signal. When there is a response from the data communication device or the data communication terminal (YES at S604), the process proceeds to S605 to carry out a data transmission process. When there is no response from the data communication device and the data communication terminal (NO at S604), the process proceeds to S606.

At S605, control unit 402 carries out data transmission. Details of this data transmission process will be described afterwards with reference to FIG. 9.

At S606, control unit 402 determines whether a predetermined time has elapsed from the transmission of the announce signal. At the elapse of a predetermined time (YES at S606), the process proceeds to S607. If the predetermined time has not yet elapsed (NO at S606), the process returns to S603.

At S607, control unit 402 determines whether the data communication device can receive data from another data communication device or a data communication terminal. This determination is based on, for example, whether there is an empty space to store the received data in main storage unit 405 or not. If data can be received (YES at S607), the process proceeds to S608. If data cannot be received (NO at S607), the process returns to S602.

At S608, control unit 402 waits for reception of an announce signal transmitted from the data communication device or the data communication terminal that is capable of data transmission.

At S609, control unit 402 determines whether an announce signal has been detected or not. When an announce signal transmitted from the data communication device or the data communication terminal has been detected (YES at S609), the process proceeds to S610 to carry out a reception process. When an announce signal from the data communication device and the data communication terminal has not been detected (NO at S609), the process proceeds to S611.

At S610, control unit 402 carries out a data reception process. Details of this data reception process will be described afterwards with reference to FIG. 10.

At S611, control unit 402 determines whether a predetermined time has elapsed from the reception standby state. At an elapse of a predetermined time (YES at S611), the process proceeds to S602. If the predetermined time has not yet elapsed (NO at S611), the process returns to S608.

When there are a plurality of data communication devices and data communication terminals capable of data reception, the process of S603 and S604 is carried out as below.

At S603, control unit 402 transmits an announce signal and an apparatus ID specifying the destination. Only the data communication device or the data communication terminal capable of data transmission and that has an apparatus ID matching the received apparatus ID transmits a response signal with respect to the announce signal. By changing the apparatus ID randomly or by increasing the numeric value representing the apparatus ID sequentially, the apparatus ID transmitted together with the announce signal can be modified. Accordingly, the one communication device or the one communication terminal responding to the announce signal can be identified even if a plurality of communication devices and communication terminals are connected physically through wire.

Also, by allowing specification of an apparatus ID transmitted together with an announce signal within a predetermined range, the one communication device or the one communication terminal that has first transmitted a response signal with respect to the announce signals from the plurality of apparatuses in the specified range can be identified. In this case, control unit 402 identifies the communication device or the communication terminal with the fastest response to the announce signal as the transmission destination at S604.

By carrying out such a process of S603 and S604, the one communication device or the one communication terminal capable of communication therewith can be specified in the communication through wire, as well as in the communication through radio.

Process of Data Communication Device Carrying Out Only Transmission

Figure 7:
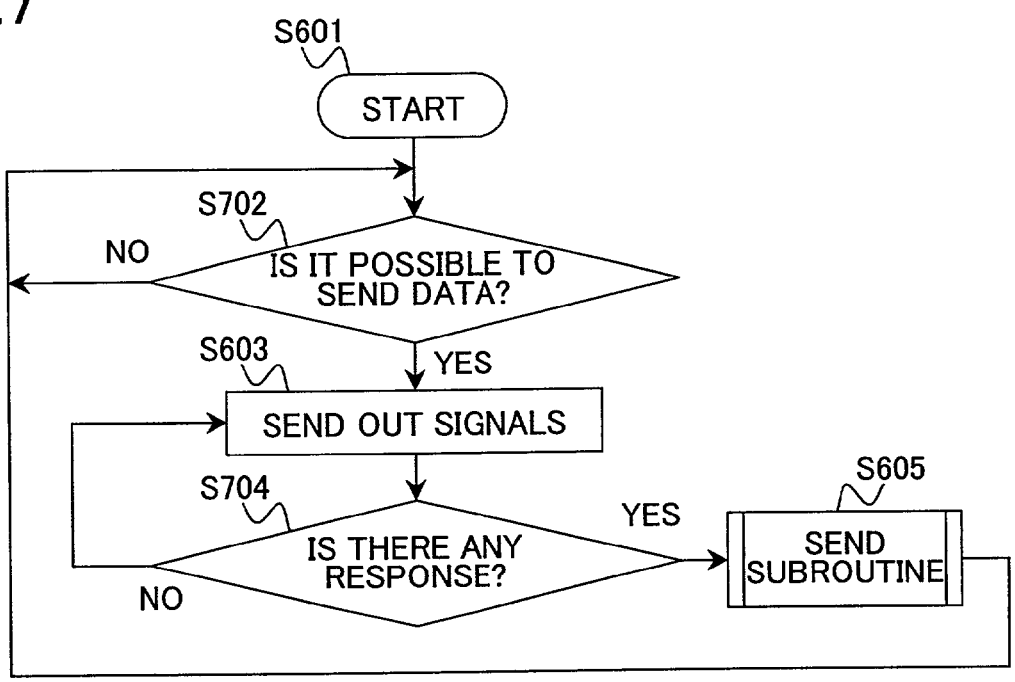
FIG. 7 is a flow chart schematically representing a process of a data communication device (capable of transmission only) of the present invention.

FIG. 7 is a flow chart representing the control flow of a process carried out by the data communication apparatus that has only a data transmission mode. The control block of the data communication device corresponds to the control block of the data communication apparatus having both a transmission mode and a reception mode of FIG. 4, provided that reception unit 404 is absent. In the process of the flow chart of FIG. 7, steps corresponding to those of the flow chart of FIG. 6 have the same step number allotted. Detailed description thereof will not be repeated where appropriate.

At S702, control unit 402 determines whether the data communication device can transmit data to another data communication device or a data communication terminal. This determination is based on, for example, whether data to be transmitted is stored in main storage unit 405 or not. When data transmission is possible (YES at S702), the process proceeds to S603. When data transmission is not possible (NO at S702), the process returns to S702 to wait until data transmission is possible.

At S704, control unit 402 determines whether there is response to the announce signal. When there is a response from the data communication device or the data communication terminal (YES at S704), the process proceeds to S605 to carry out a data transmission process. When there is no response from the data communication device and the data communication terminal (NO at S704), the process returns to S603 to transmit an announce signal until there is a response to the announce signal.

Process of Data Communication Device that Carries Out Only Reception

Figure 8:
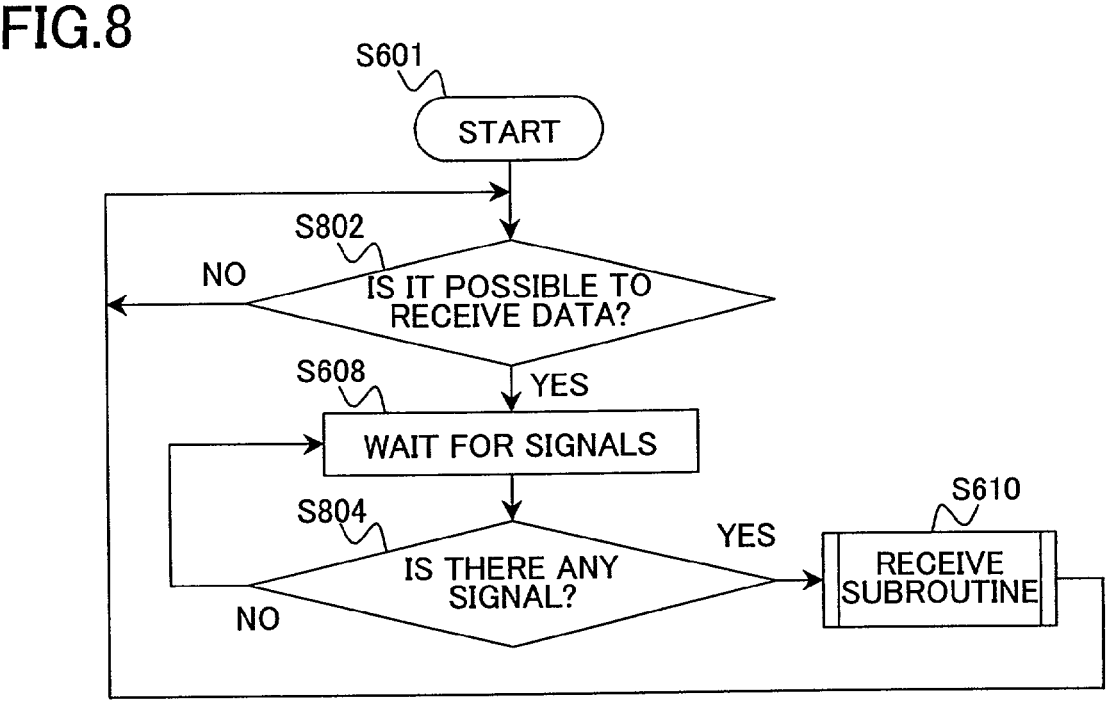
FIG. 8 is a flow chart schematically representing a process of a data communication device (capable of reception only) of the present invention.

FIG. 8 is a flow chart of a control flow of the process carried out by a data communication device that has only a data reception mode. The control block of this data communication device corresponds to the control block of the data communication device having both a transmission mode and a reception mode of FIG. 4, provided that transmission unit 403 is absent. In the process of the flow chart of FIG. 8, steps corresponding to those in the flow chart of FIG. 6 have the same step number allotted. Therefore, detailed description thereof will not be repeated where appropriate.

At S802, control unit 402 determines whether the data communication device can receive data from another data communication device or a data communication terminal. This determination is based on, for example, whether there is an empty space to store the received data in main storage unit 405. When data reception is possible (YES at S802), the process proceeds to S608. When data reception is not possible (NO at S802), the process returns to S802 to wait until data reception is possible.

At S804, control unit 402 determines whether an announce signal has been detected or not. When an announce signal transmitted from the data communication device or the data communication terminal has been detected (YES at S804), the process proceeds to S610 to carry out a reception process. When an announce signal from the data communication device and the data communication terminal is not detected (NO at S804), the process returns to S608 to wait until an announce signal is received.

Data Transmission Process of Data Communication Device

Figure 9:
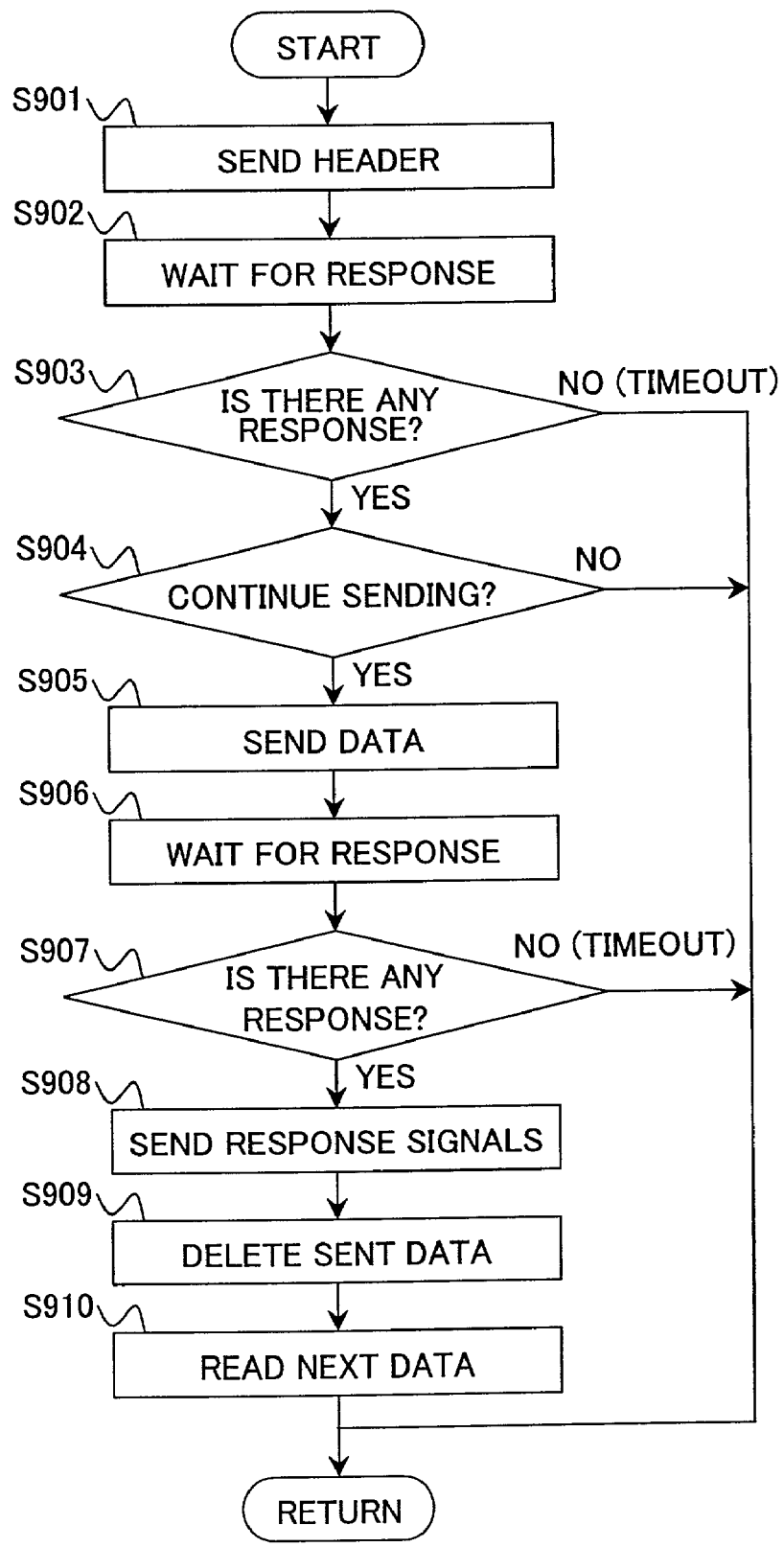
FIG. 9 is a flow chart representing a data transmission process of a data communication device.

FIG. 9 is a flow chart of a control flow of the process for a data communication device to transmit data to another data communication device or a data communication terminal. The flow chart of FIG. 9 shows the detail of the process of S605 in FIG. 6.

At S901, control unit 402 transmits the header portion alone of the transmission data to the data communication device or the data communication terminal of the reception side.

At S902, control unit 402 waits for a response from the data communication device or the data communication terminal of the reception side.

At S903, control unit 402 determines whether there is a response from the data communication device or the data communication terminal of the reception side until elapse of a predetermined time from the transmission of the header portion of data. When there is a response from the data communication device or the data communication terminal of the reception side (YES at S903), the process proceeds to S904. When there is no response from the data communication device and the data communication terminal of the reception side (NO at S903), the process of the flow chart of FIG. 9 ends.

At S904, control unit 402 determines whether the transmission process is to be continued or not based on a response from the data communication device or the data communication terminal of the reception side. When the response received from the data communication device or the data communication terminal of the reception side requests continuation of data transmission (YES at S904), the process proceeds to S905. When the response from the data communication device or the data communication terminal of the reception side requests cancel of data transmission (NO at S904), the process of the flow chart of FIG. 9 ends.

At S905, control unit 402 transmits the data body to the data transmission device or the data communication terminal of the reception side.

At S906, control unit 402 waits for a response from the data communication device or the data communication terminal of the reception side.

At S907, control unit 402 determines whether there is a response from the data communication device or the data communication terminal of the reception side before the elapse of a predetermined time from the transmission of the data body. When there is response from the data communication device or the data communication terminal of the reception side (YES at S907), the process proceeds to S908. When there is no response from the data communication device and the data communication terminal of the reception side (NO at S907), the process of the flow chart of FIG. 9 ends.

At S908, control unit 402 transmits a response message to the data communication device or the data communication terminal of the reception side.

At S909, control unit 402 deletes from main storage unit 405 the data transmitted to the data communication device or the data communication terminal of the reception side.

At S910, control unit 402 reads in the next data to be transmitted, and the process of the flow chart of FIG. 9 ends. In the case of a data communication device that has only a transmission mode in the process of S910, the next data is received via network 104. The received data is taken as the next data to be transmitted. In the case of a data communication device having only a reception mode, the data from the data communication device or the data communication terminal of the transmission side is received, and the received data is taken as the data to be transmitted next.

Data Reception Process of Data Communication Device

Figure 10:
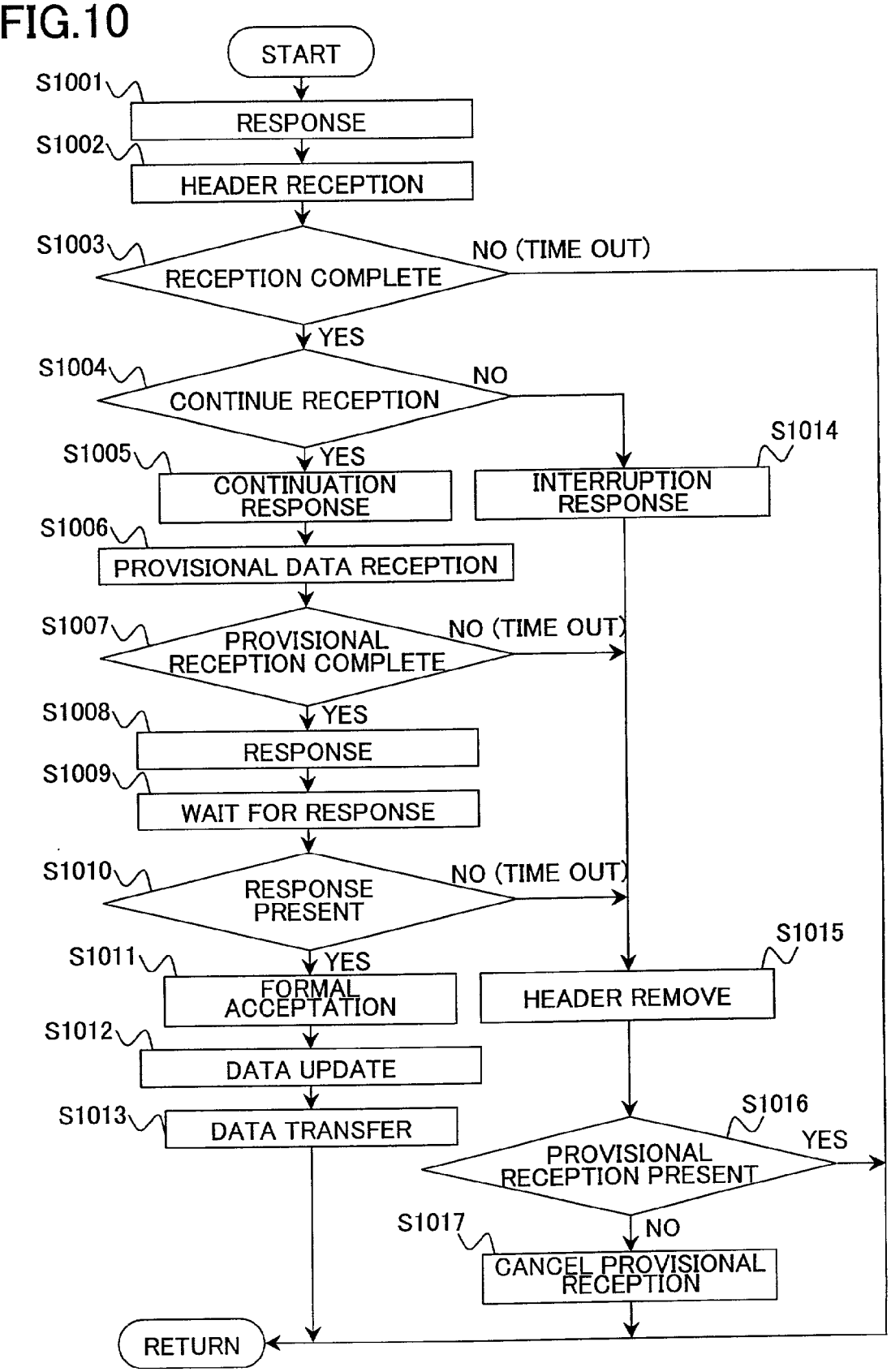
FIG. 10 is a flow chart representing a data reception process of a data communication device.

FIG. 10 is a flow chart representing a control flow of the process for a data communication device receiving data from another data communication device or a data communication terminal. The flow chart of FIG. 10 corresponds to the detail of the process of S610 of FIG. 6.

At S1001, control unit 402 transmits a response signal with respect to the announce signal transmitted from the data communication device or the data communication terminal of the transmission side.

At S1002, control unit 402 receives the header portion of data from the data communication device or the data communication terminal of the transmission side.

At S1003, determination is made whether the data header portion transmitted from the data communication device or the data communication terminal of the transmission side has been received correctly before the elapse of a predetermined time from the transmission of the response signal. When the header transmitted from the data communication device or the data communication terminal of the transmission side has been received correctly (YES at S1003), the process proceeds to S1004. When the header was not received correctly (NO at S1003), the process of the flow chart of FIG. 10 ends.

At S1004, control unit 402 analyzes the header received from the data communication device or the data communication terminal of the transmission side to determine whether to continue the reception process or not. For example, by looking into the "ID list of apparatuses recently dropped" stored in the header of the data for its own apparatus ID and identifying its own apparatus ID in the list, determination is made that the reception process is not to be continued. When determination is made of continuation of the reception process (YES at S1004), the process proceeds to S1005. When determination is made of the interruption of the reception process (NO at S1004), the process proceeds to S1014.

At S1005, control unit 402 transmits the continuation response to the data communication device or the data communication terminal of the transmission side.

At S1006, control unit 402 receives provisionally the data body transmitted from the data communication device or the data communication terminal of the transmission side.

At S1007, control unit 402 determines whether the data body transmitted from the data communication device or the data communication terminal of the transmission side has been received correctly or not before the elapse of a predetermined time from the transmission of the continuation response. When the data body has been received correctly (YES at S1007), the process proceeds to S1008. When the data body could not be received correctly (NO at S1007), the process proceeds to S1015.

At S1008, control unit 402 transmits a response indicating completion of the provisional reception of data to the data transmission device or the data communication terminal of the transmission side.

At S1009, control unit 402 waits for a response from the data communication device or the data communication terminal of the transmission side.

At S1010, control unit 402 determines whether there was a response from the data transmission device or the data communication terminal of the transmission side before the elapse of a predetermined time from the transmission of the response indicating completion of data provisional reception. When there is a response from the data communication device or the data communication terminal of the transmission side (YES at S1010), the process proceeds to S1011. When there is not a response indicating completion of the provisional reception of data (NO at S1010), the process proceeds to S1015.

At S1011, control unit 402 formally accepts the provisionally received data.

At S1012, control unit 402 updates the data stored in the header portion, modifies the contents of the data body, and the like. In the event of virtual pet data, for example, "ID list of apparatuses recently dropped" and "number of transmissions among apparatuses" and the like are updated in the header portion. In the data body, data representing the growth level, appearance, and the like of the virtual pet is modified. When the data expiration date has expired or the number of data valid transmissions has been exceeded, the data is deleted.

At S1013, control unit 402 transfers data to an apparatus such as a household television with the data transmission function. The process of S1013 is carried out as necessary, using the data transmission function of the data communication device per se.

At S1014, control unit 402 transmits an interruption response to the data communication device or the data communication terminal of the transmission side.

At S1015, control unit 402 cancels the header of the received data.

At S1016, control unit 402 confirms that the provisional reception of the data body transmitted from the data communication device or the data communication terminal of the transmission side has been completed (YES at S1016 since YES at S1007 and NO at S1010), and the process proceeds to S1017. When the provisional reception of the data body has not been completed (NO at S1016), the process of the flow chart of FIG. 10 is terminated.

At S1017, control unit 402 cancels the data body received provisionally and ends the process of the flow chart of FIG. 10.

Transmission/Reception Mode Switch Process of Data Communication Terminal

Figure 11:
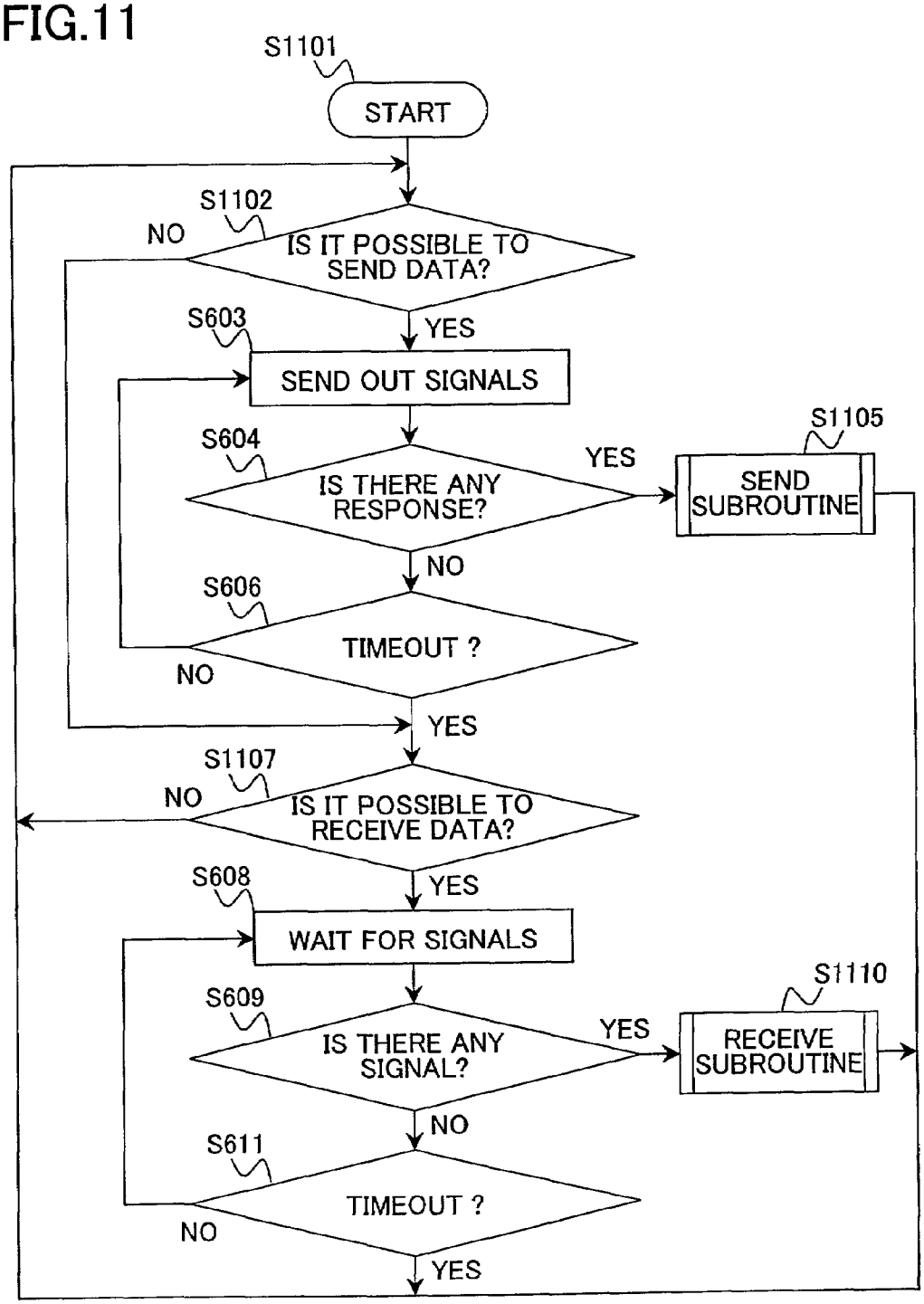
FIG. 11 is a flow chart schematically representing a process of a data communication terminal of the present invention.

FIG. 11 is a flow chart representing a control flow of the process for the data communication terminal to switch between a transmission mode and a reception mode. Description is provided hereinafter based on a data communication terminal having the structure represented by the block diagram of FIG. 4. In the process of the flow chart of FIG. 11, steps corresponding to those of the flow chart of FIG. 6 have the same step number allotted. Detailed description thereof will not be repeated where appropriate.

At S1101, a command to turn on the power is input from input unit 401 of the data communication terminal, whereby the process is initiated.

At S1102, control unit 402 determines whether data transmission from the data communication terminal is possible or not. This determination is based on whether there is one or more data not locked in the data communication terminal. When data transmission is possible (YES at S1102), the process proceeds to S603. When data transmission is not possible (NO at S1102), the process proceeds to S1107.

At S1105, control unit 402 carries out a data transmission process. This process will be described in detail with reference to FIG. 12 afterwards.

At S1107, control unit 402 determines whether the data communication terminal can receive data from a data communication device or another data communication terminal. This determination is based on, for example, whether there is an empty space to store the received data in main storage unit 405, whether the number of data stored in the data communication terminal has not yet arrived at the upper limit of the number of data that can be saved, and the like. When data can be received (YES at S107), the process proceeds to S608. When data reception is not possible (NO at S1107), the process returns to S1102.

At S1110, control unit 402 carries out a data reception process. This process will be described in detail with reference to FIG. 13 afterwards.

Data Transmission Process of Data Communication Terminal

Figure 12:
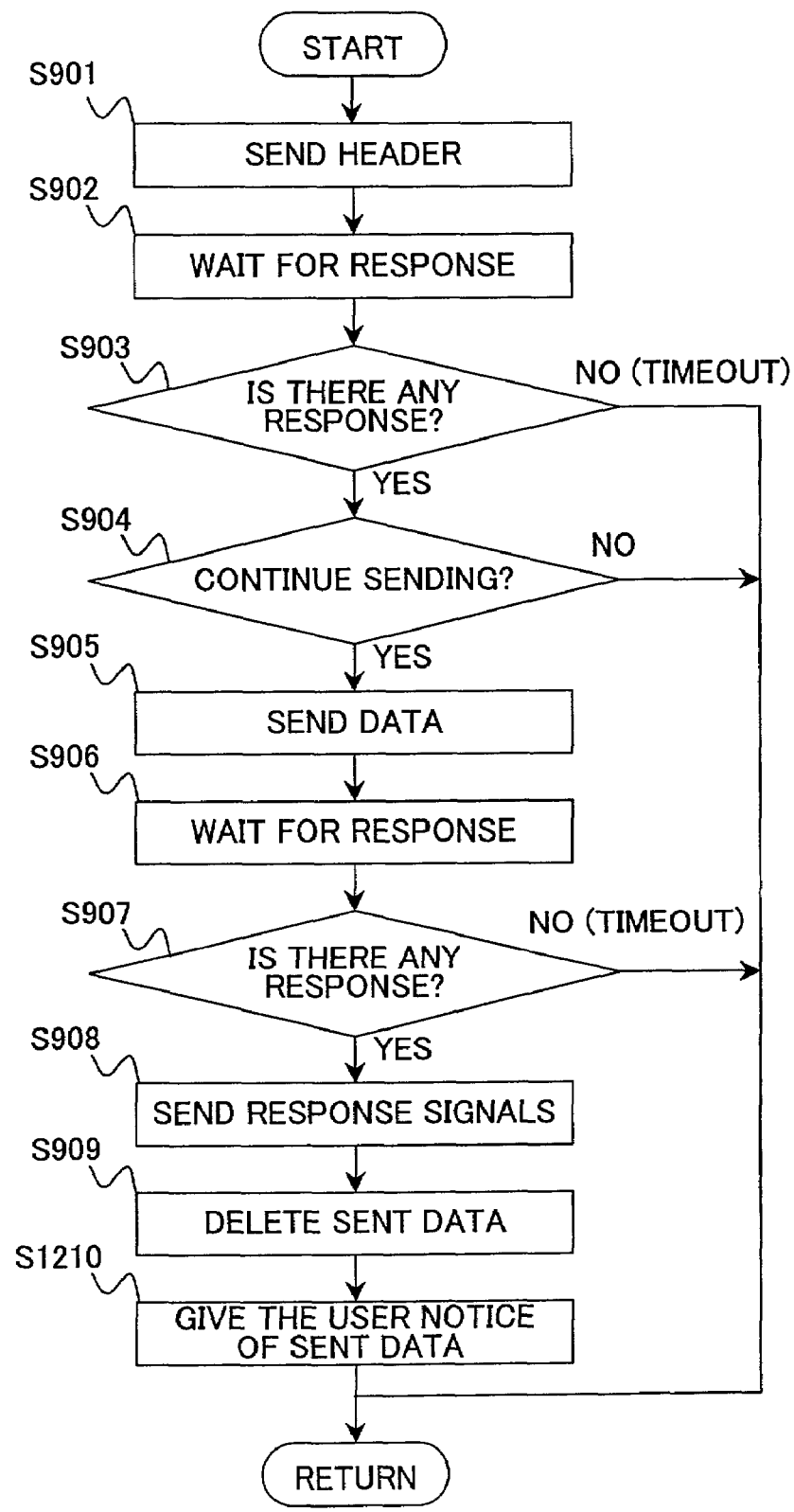
FIG. 12 is a flow chart representing a data transmission process of a data communication terminal.

FIG. 12 is a flow chart representing a control flow of the process for the data communication terminal to transmit data to a data communication device or another data communication terminal. The flow chart of FIG. 12 corresponds to the detail of the process of S1105 in FIG. 11. In the process of the flow chart of FIG. 12, steps identical to those of the flow chart of FIG. 9 have the same step number allotted. Detailed description thereof will not be repeated where appropriate.

At S1210, control unit 402 notifies the user of the data communication terminal of the transmission side the occurrence of data transmission operation by audio, vibration, or the like. It is to be noted that the process of S1210 is not carried out when the user has intentionally inhibited this notification. Following the process of S1210, the process of the flow chart of FIG. 12 ends.

Data Reception Process of Data Communication Terminal

Figure 13:
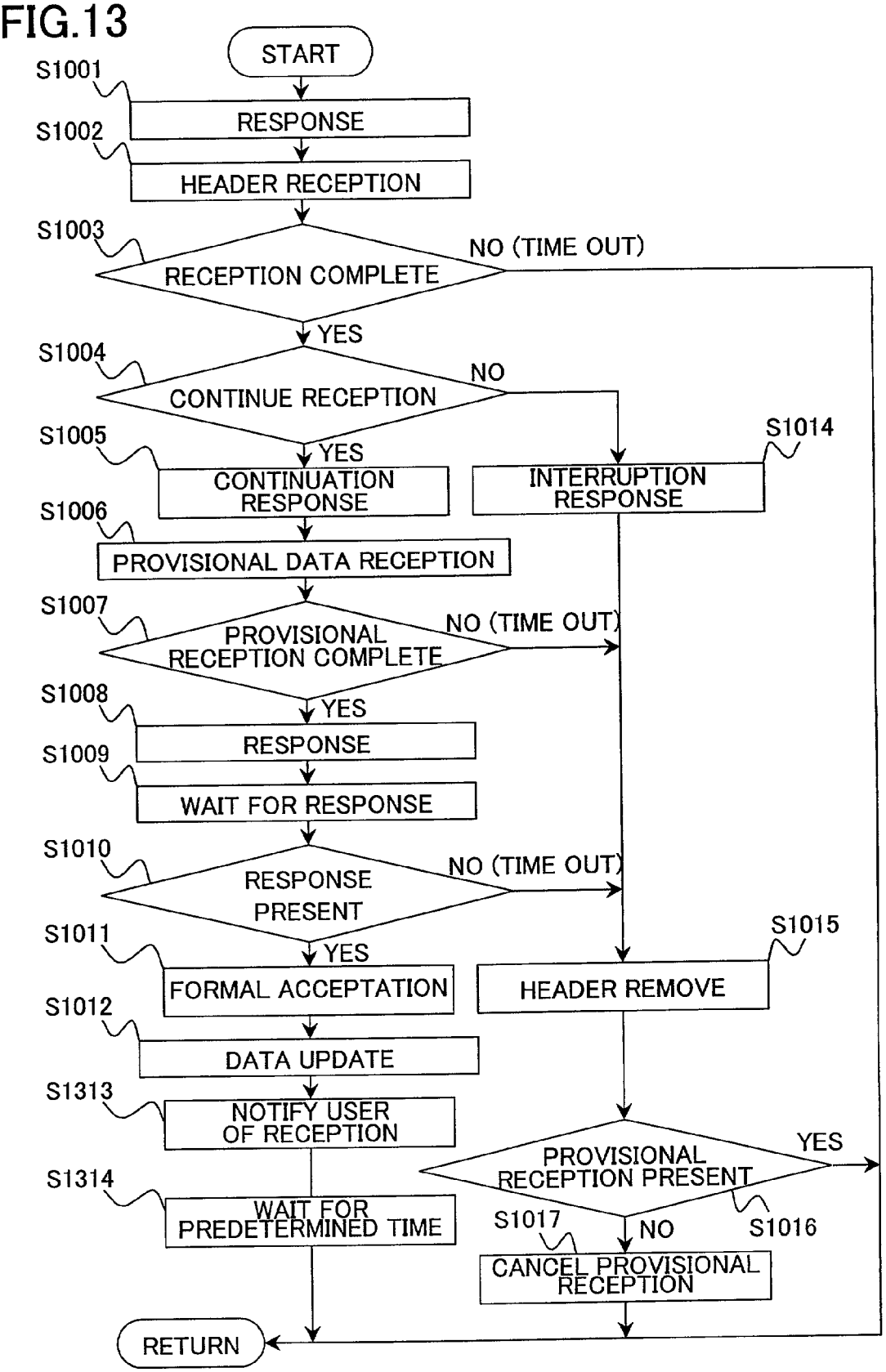
FIG. 13 is a flow chart representing a data reception process of a data communication terminal.

FIG. 13 is a flow chart showing a control flow of the process for a data communication terminal to receive data from a data communication device or another data communication terminal. The flow chart of FIG. 13 corresponds to the details of the process of S1110 in FIG. 11. In the process of the flow chart of FIG. 13, steps corresponding to those of flow chart of FIG. 10 have the same reference number allotted. Therefore, detailed description thereof will not be repeated where appropriate.

At S1313, control unit 402 notifies the user of the data transmission terminal of the reception side the occurrence of a data reception operation through audio, vibration, or the like. It is to be noted that the process of S1313 is not carried out when the user has intentionally inhibited this notification.

At S1314, control unit 402 enters a standby status so that a data transmission/reception operation will not occur for a predetermined time from completion of data reception. At the end of the standby state, the process of the flow chart of FIG. 13 is completed.

Data Communication Operation

An operation of the data communication system will be described based on the above structure and flow charts.

Description is provided based on a data communication device or a data communication terminal having the operation mode of a transmission mode and a reception mode. A data communication device or a data communication terminal in a status capable of data transmission is referred to as "transmission side device or terminal", and a data communication device or a data communication terminal in a status capable of data reception is referred to as "reception side device or terminal".

The transmission side device or terminal transmits an announce signal when its own operation mode corresponds to the transmission mode (S603). When the reception side device or terminal enters the range where communication with the transmission side device or terminal is allowed, the reception side device or terminal receives an announce signal (YES at S609). The reception side device or terminal receiving the announce signal sends a response signal with respect to the announce signal to the transmission side device or terminal (S1001).

Upon reception of a response signal with respect to the announce signal(YES at S604), the transmission side device or terminal transmits the header to the reception side device or terminal (S901). When the reception side device or terminal receives the header before the elapse of a predetermined time (YES at S1003), the reception side device or terminal analyzes the contents of the header to determine whether to continue the reception operation or not (S1004). When determination is made of continuation of the reception operation (YES at S1004), the reception side device or terminal transmits a continuation response to the transmission side device or terminal (S1005).

When the transmission side device or terminal receives a continuation response before the elapse of a predetermined time (YES at S903 and YES at S904), the body data is transmitted to the reception side device or terminal (S905). Upon receiving provisionally the body data within a predetermined time (YES at S1007), the reception side device or terminal transmits a response signal with respect to the provisional reception of body data to the transmission side device or terminal (S1008).

When the transmission side device or terminal receives a response signal transmitted at S1008 before the elapse of a predetermined time (YES at S907), a response signal is transmitted to the reception side device or terminal (S908), and the transmitted data is erased from main storage unit 405.

When the reception side device or terminal receives a response signal transmitted at S908 before the elapse of a predetermined time (YES at S1010), the provisionally received body data is accepted (S1011), and the header information is updated (S1012).

By the data communication apparatus using the data communication device or the data communication terminal of the present invention, data communication without leaving a duplicate of data in a plurality of data communication devices and data communication terminals can be realized. It is to be noted that data will be erased from both the transmission side communication device and reception side communication device when communication fails.

The following second to eighth embodiments correspond to the application of the data communication method of the present invention to virtual pet data communication, electronic lottery system, and electronic mail system. An application using the data communication method of the present invention will be described with reference to FIGS. 14 to 38. However, the present invention is not limited by these embodiments to an application of a particular communication subject.

Second Embodiment

Communication of virtual pet data according to the present embodiment will be described with reference to FIGS. 14 to 23.

Figure 14:
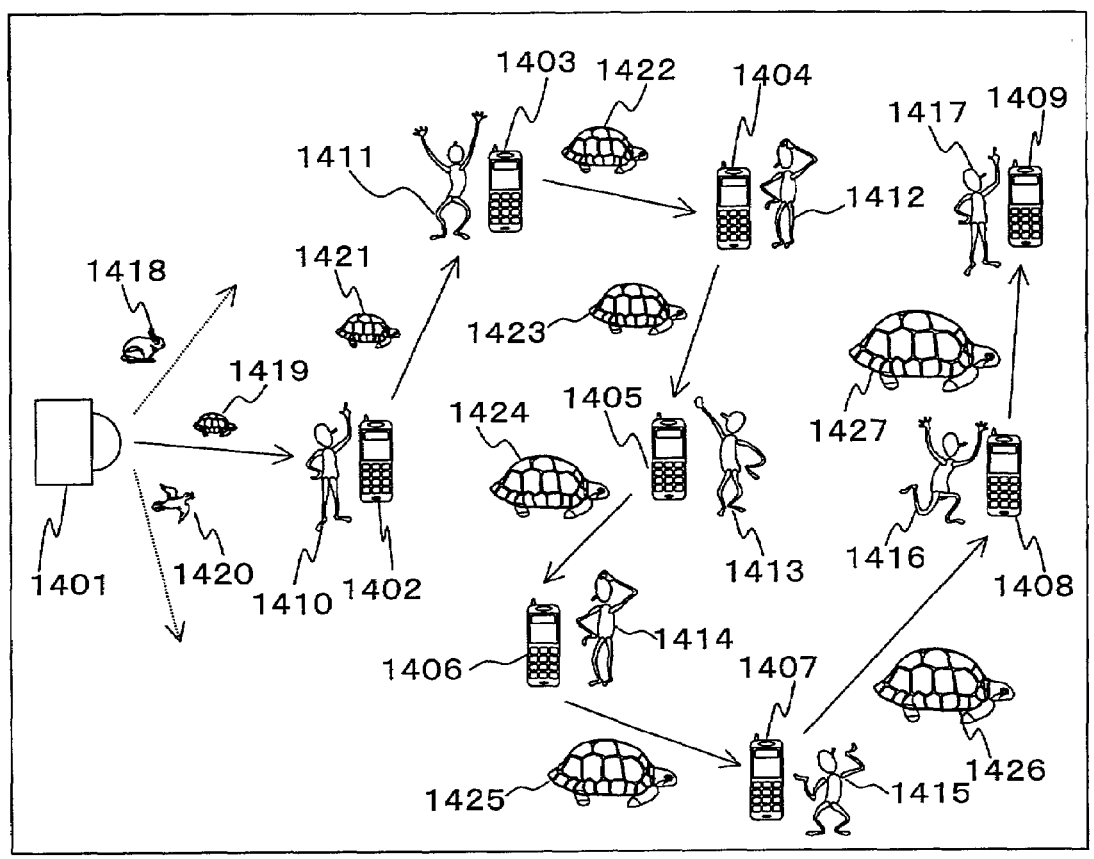
FIG. 14 shows a data communication system corresponding to the case where the data communication method of the present invention is used in the communication of virtual pet data.

FIG. 14 schematically shows a data communication system corresponding to application of the data communication method of the present invention to communication of virtual pet data.

A data communication device 1401 is installed fixedly to a building, an advertisement display board, an automatic vending machine, or the like to transmit the virtual pet data. Data communication terminals 1402, 1403, 1404, 1405, 1406, 1407, 1408 and 1409 transmit and receive the virtual pet data. Data communication terminals 1402, 1403, 1404, 1405, 1406, 1407, 1408 and 1409 are owned by individuals 1410, 1411, 1412, 1413, 1414, 1415, 1416 and 1417, respectively. A data communication system is built dynamically by these individuals moving with respective data communication terminals. The virtual pet data is transmitted among the data communication terminals. Virtual pets 1418, 1419 and 1420 are displayed on a liquid crystal display of the data communication terminal. Data to display virtual pets 1418, 1419 and 1420 is transmitted by data communication device 1401.

Referring to FIG. 14, virtual pet data to display a virtual pet 1419 transmitted by data communication device 1401 is received at data communication terminal 1402. Then, the virtual pet data to display virtual pet 1419 is sequentially transmitted through data communication terminals 1403, 1404, 1405, 1406, 1407, 1408 and 1409.

Virtual pets 1421, 1422, 1423, 1424, 1425, 1426 and 1427 are displayed based on the virtual pet data transmitted among the data communication terminals. The contents of the virtual pet data changes to gradually grow as the number of transmissions between data communication terminals increases.

Figure 15:
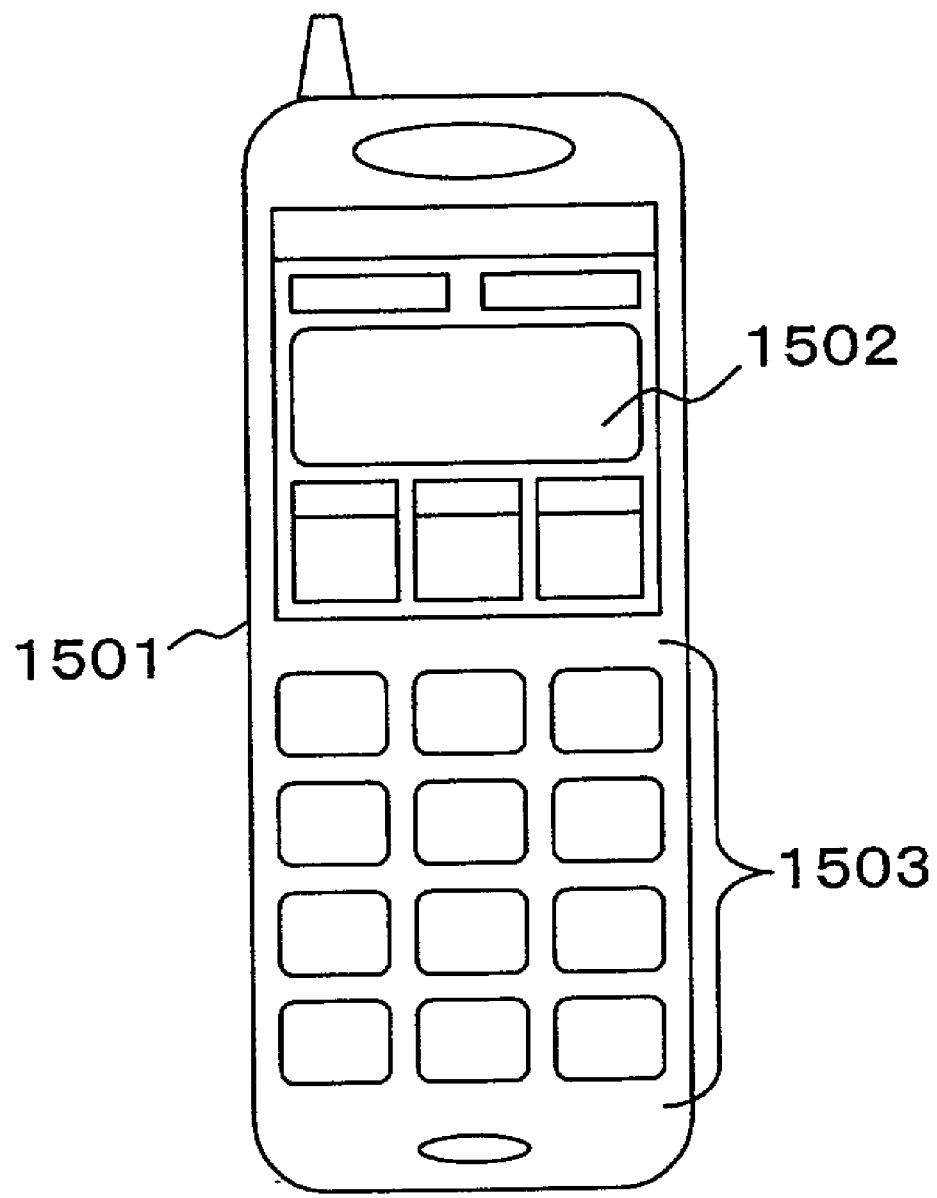
FIG. 15 shows an appearance of a portable telephone which is an example of a data communication terminal.

FIG. 15 shows an appearance of a data communication terminal of the present embodiment. This data communication terminal is a portable telephone or PHS that can execute the data communication method of the present invention. The virtual pet data of the present embodiment is displayed at a display unit 1502 of data communication terminal 1501. Various operations of the data communication terminal are effected using hard buttons (SUI) 1503.

Figure 22:
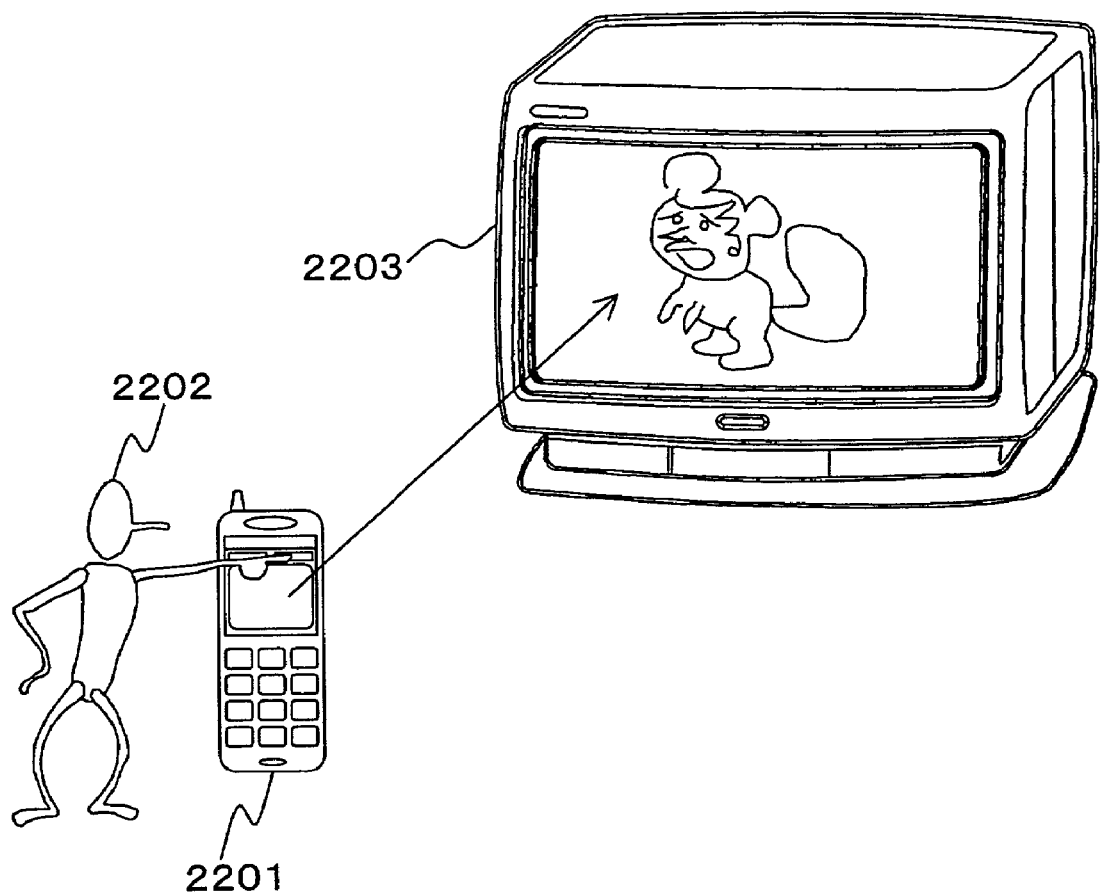
FIG. 22 represents the concept corresponding to transferring virtual pet data to a household appliance from a data communication terminal.
Figure 23:
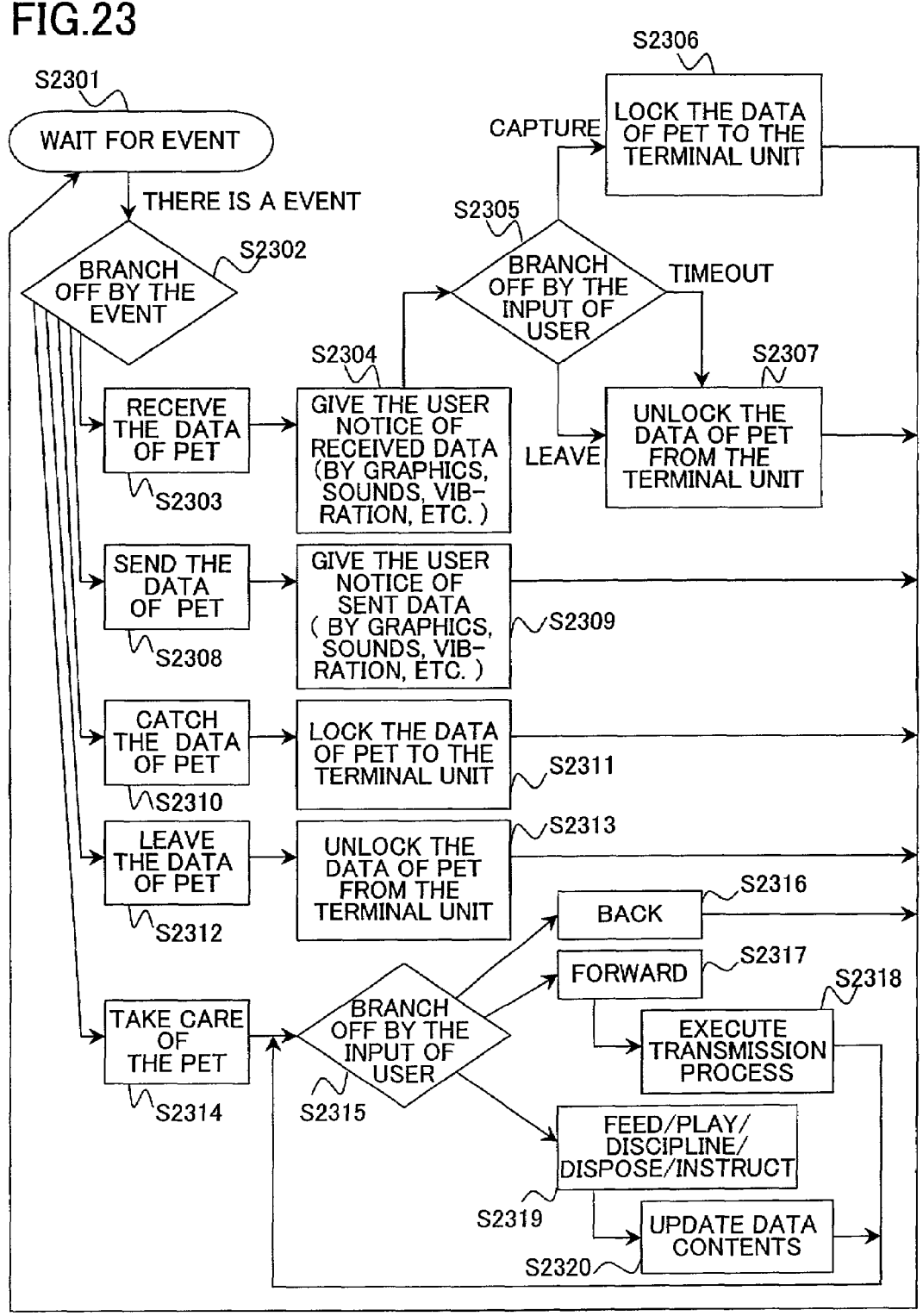
FIG. 23 is a flow chart schematically representing a process corresponding to the case where the data communication method of the present invention is used in the communication of virtual pet data.

The virtual pet transmission and reception process of the present embodiment will be described with reference to the display on the display unit of the data communication terminal shown in FIGS. 16 to 21, the exemplified usage of the data communication terminal of FIG. 22, and the flow chart of FIG. 23. The flow chart of FIG. 23 represents the control flow of the program executed by the data communication terminal. It is assumed that the main storage unit of the data communication terminal of the present embodiment can save three virtual pet data at most. The display unit of the data communication terminal is formed using a touch panel on liquid crystal display device to be also used as the input unit. Input is effected by touching the GUI displayed on the screen. The following description is based on a data communication terminal having a structure represented by the block diagram of FIG. 4.

At S2301, control unit 402 waits for an event with respect to the data communication terminal. This event includes data transmission and reception, and an input by the user. When the data communication terminal is in a state where transmission, reception, or transmission and reception of data is allowed at the current stage, communication with another data communication apparatus is attempted according to the flow chart of FIG. 11.

At S2302, control unit 402 branches the process according to the type of an event, when any, with respect to the data communication terminal. The five events of "receive pet data", "transmit pet data", "capture pet data", "leave pet data" and "take care of pet data" will be described hereinafter by way of example.

At S2303, control unit 402 carries out the process corresponding to the occurrence of the event "receive pet data". Data is received according to the method represented by the flow chart of FIG. 13 at S2303. The received pet data is stored in the main storage unit of the data communication terminal. Then, the process proceeds to S2304.

Figure 16:
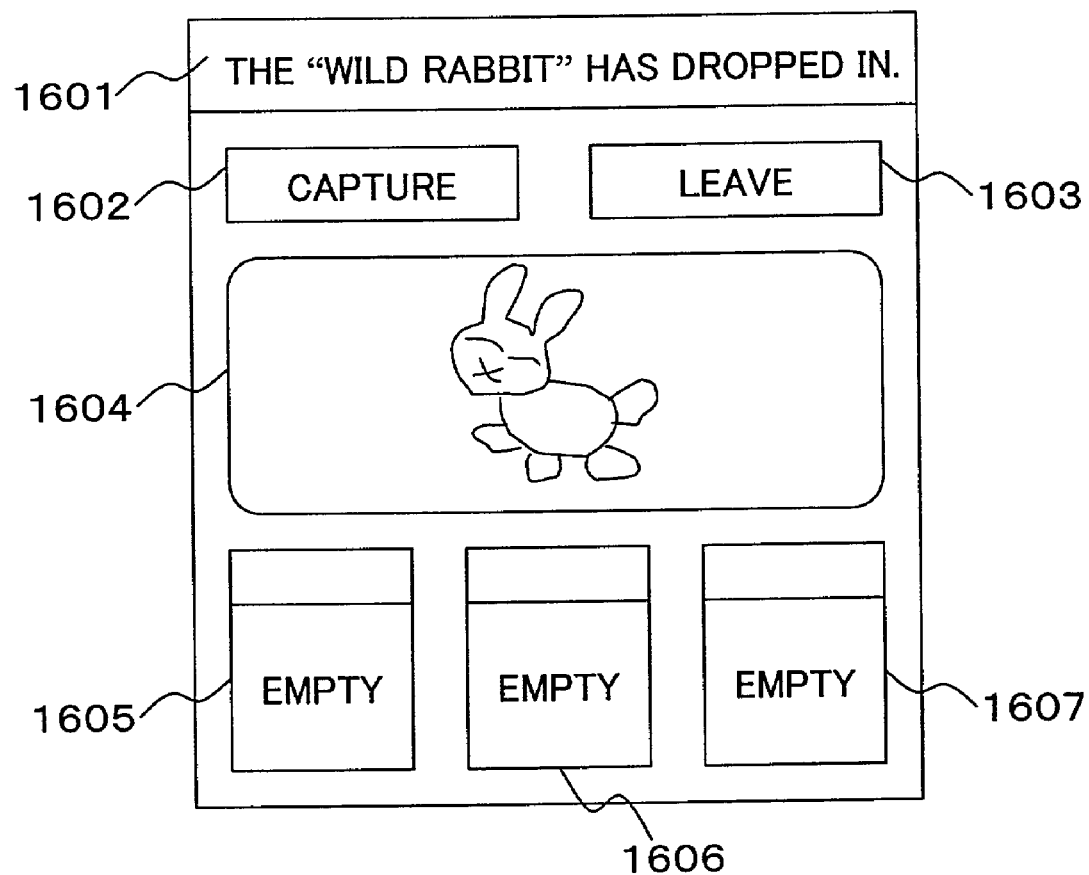
FIGS. 16 to 21 show examples of displays of a data communication terminal.

At S2304, control unit 402 notifies the user of pet data reception. FIG. 16 represents the contents displayed at the display unit of the data communication terminal when the virtual pet data is received from a data communication device or another data communication terminal. The event occurring with respect to the data communication terminal is displayed at display unit 1601. Referring to FIG. 16, the display of "the wild rabbit has dropped in" is provided. This implies that virtual pet data named "wild rabbit" is received from the data communication device or the data communication terminal. Display units 1602 and 1603 provide the display of the action that can be executed by the user with respect to the event at the data communication terminal. At this stage, the actions of "capture" "leave" can be selected with respect to the wild rabbit data dropped in.

A graphical representation of the virtual pet is provided in display unit 1604. A figure of a wild rabbit is displayed. In display units 1605, 1606 and 1607 are displayed virtual pets currently saved in the data communication terminal. When there is no virtual pet data saved in the data communication terminal, the display of "EMPTY" is provided in all the displays. Simultaneous to the change of the display when the data communication terminal receives the virtual pet data, the user of the terminal may be notified of data reception through audio or vibration, or the like. This process corresponds to the process of S1313 of FIG. 13.

At S2305, the process is branched by a user's input. When "capture" in display unit 1602 is selected in the example of FIG. 16, the process proceeds to S2306. When "leave" is selected through display unit 1603, the process proceeds to S2307. When neither action is selected, the action of "leave" is selected automatically as a time out process at an elapse of a predetermined time. Then, the process proceeds to S2307.

At S2306, control unit 402 carries out the process corresponding to the selection of the action "capture". The flag to lock the stored data is rendered to a set state in order to prevent the pet data stored in the main storage unit from being transmitted to another data communication terminal.

Figure 17:
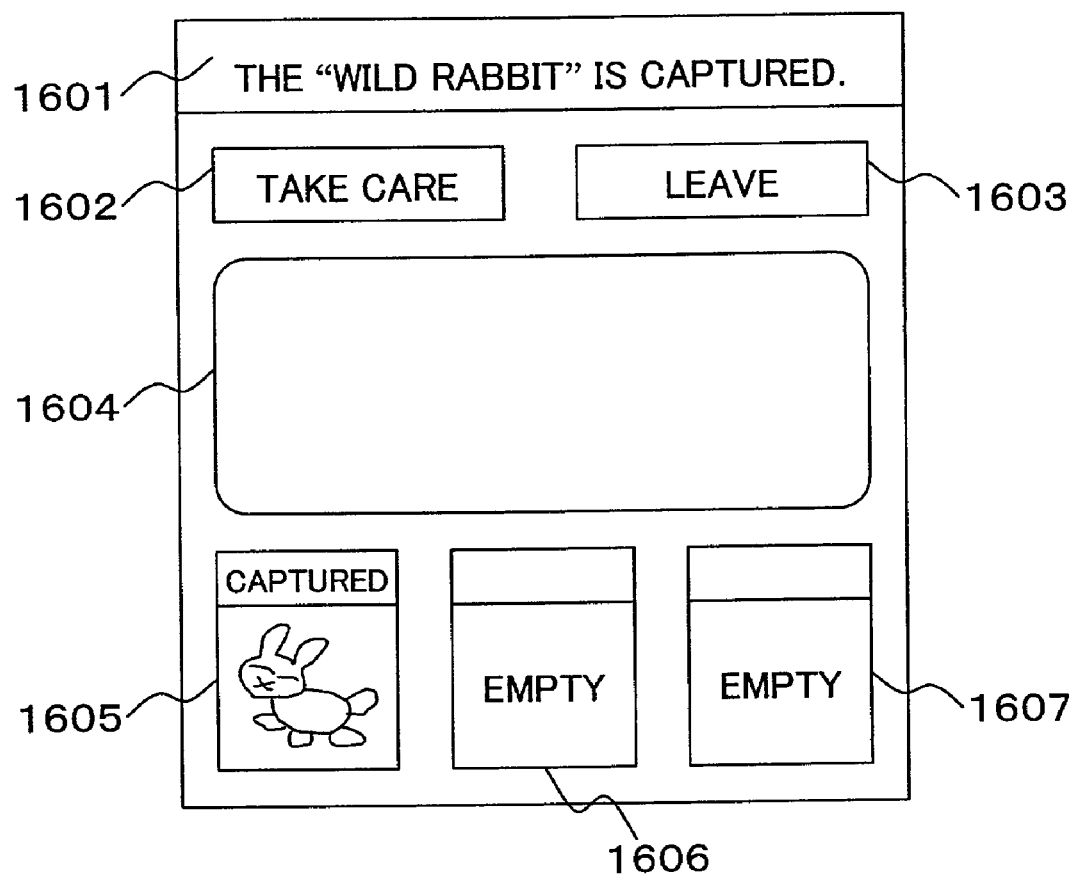

FIG. 17 shows the display unit of the data communication terminal when virtual pet data is captured. The display of "wild rabbit is captured" is provided in display unit 1601. No display is provided in display unit 1604. The captured virtual pet is represented graphically in display unit 1605. The message of "captured" is displayed thereabove. This implies that the virtual pet data is locked at the data communication terminal, and will not be transmitted to another communication apparatus even when attaining a communication allowed state with a data communication device or another data communication terminal.

When the user neglects to take care of the pet, the data may be transmitted to another communication apparatus in the form of "escape" even if the virtual pet data is "locked", as will be described afterwards.

At the end of the above process, the process proceeds to S2301 to enter an event standby state.

At S2307, control unit 402 carries out a process corresponding to the selection of the action "leave". The flag to lock the data is rendered to a reset state since the pet data stored in the main storage unit can be transmitted to another data communication terminal.

Figure 18:
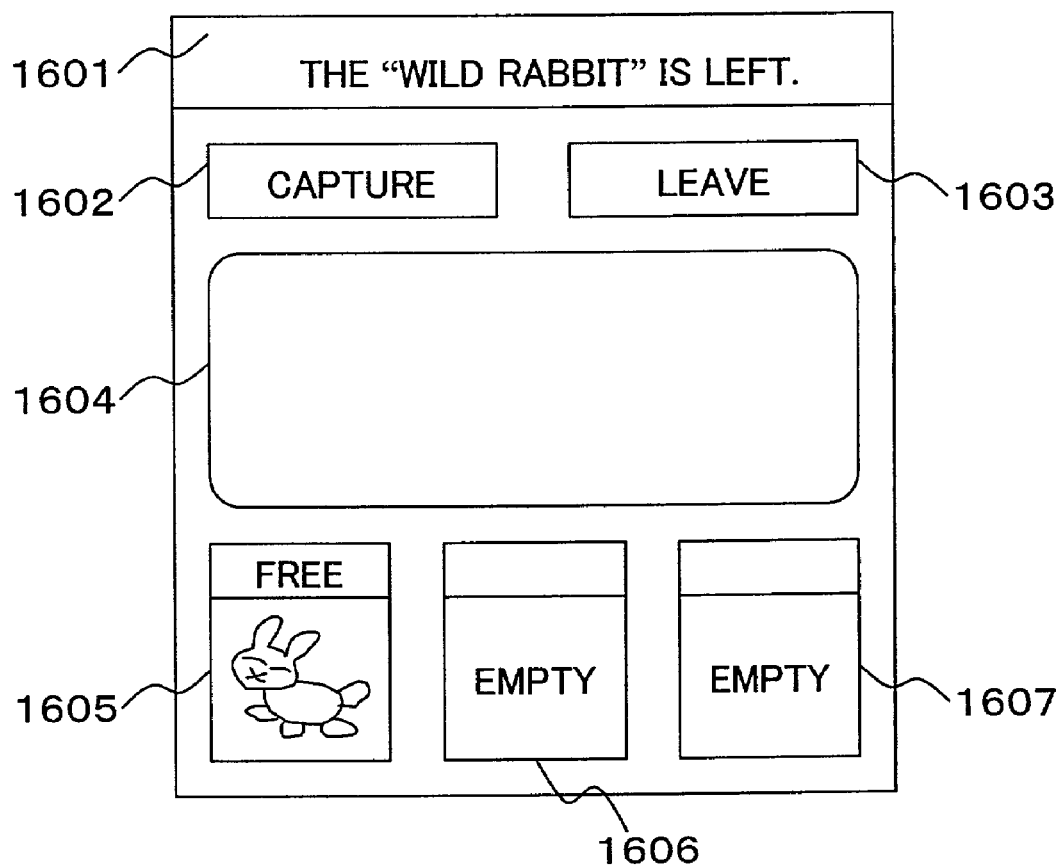

FIG. 18 shows the display unit of the data communication terminal when the virtual pet data dropped in at the data communication terminal has been left. The display of "wild rabbit is left" is provided at display unit 1601. No display is provided in display unit 1604. The left virtual pet is displayed in a graphical manner in display unit 1605. The message of "left" is provided thereabove. This implies that the virtual pet data is not locked in the data communication terminal, and indicates that there is a possibility of the data being transmitted to another terminal or the like when a communication allowed state with a data communication device or another data communication terminal is entered.

Following the above process, the process returns to S2301 to enter an event standby state.

At S2308, control unit 402 carries out a process corresponding to the occurrence of "transmit pet data" as the event. The data is transmitted according to the method represented by the flow chart of FIG. 12 at S2308. After transmission is completed, the pet data is erased from the main storage unit of the data communication terminal. Then, the process proceeds to S2309.

Figure 19:
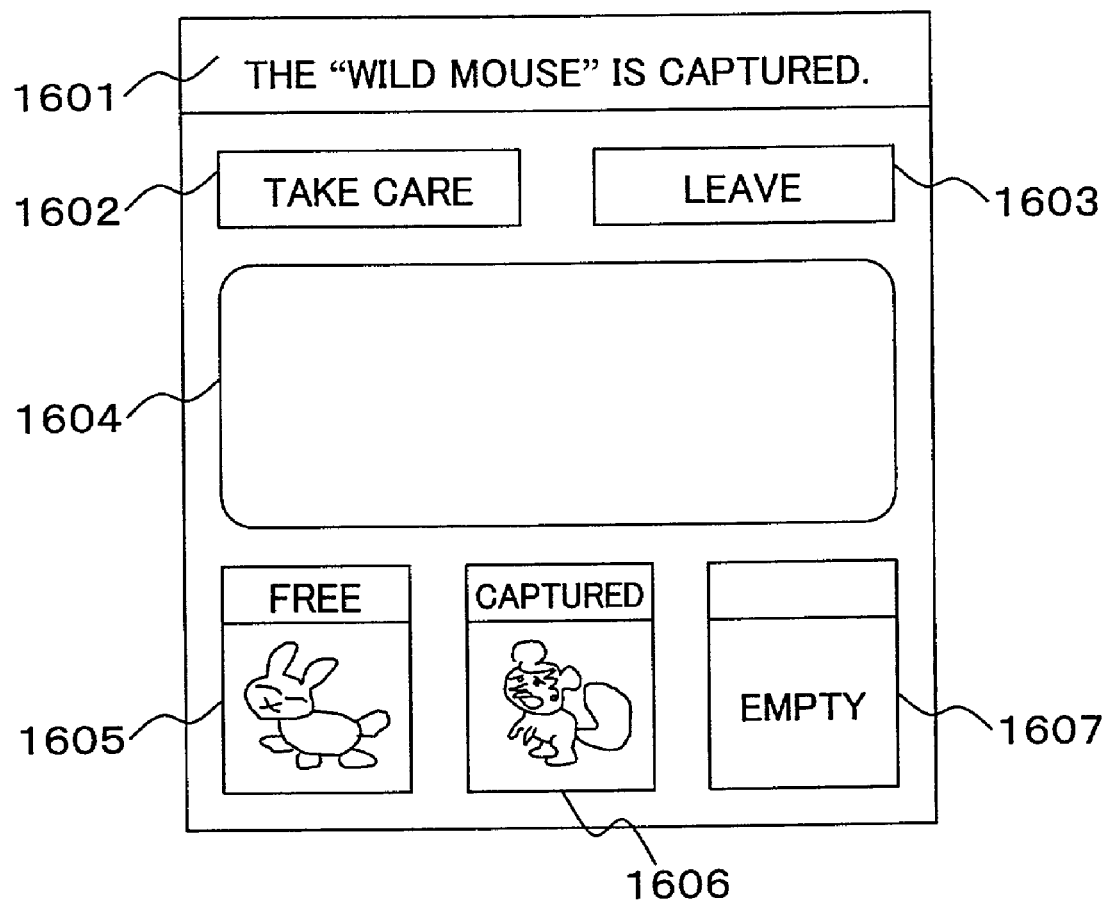
Figure 20:
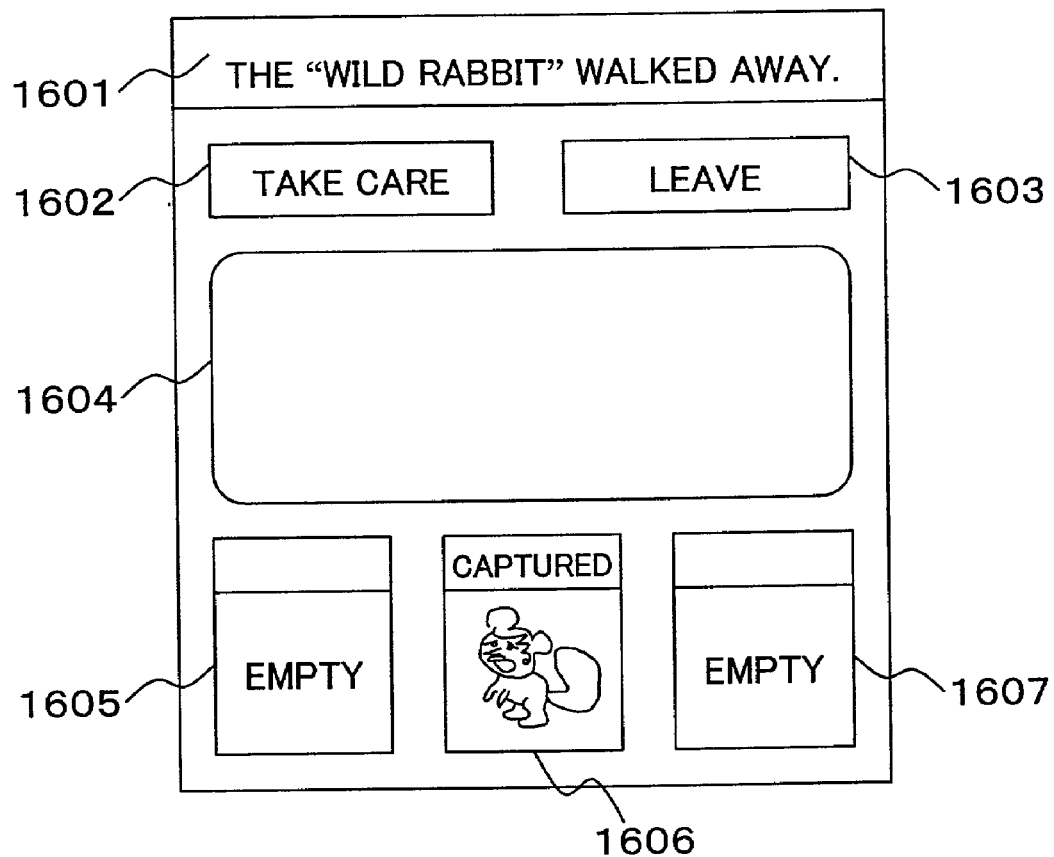

At S2309, control unit 402 notifies the user of pet data transmission. FIG. 19 shows the display unit when a virtual pet data "wild mouse" dropped in at the data communication terminal is captured from the state of FIG. 18 (the state of leaving the wild rabbit). FIG. 20 shows the display unit when the virtual pet data "wild rabbit" left at the status of FIG. 19 is transmitted to another data communication terminal.

Transmission of the virtual pet data causes display unit 1601 to provide the message of "wild rabbit has gone away" in display unit 1601. "Empty" is displayed in display unit 1605. When the captured pet data as well as the left pet data is not looked after, the data may be transmitted to another data communication terminal in the form of "escape", as will be described afterwards.

Following the above process, the process proceeds to S2301 to enter a standby state.

At S2310, control unit 402 carries out a process corresponding to the case of the occurrence of "capture pet data" by a user's input as an event. The pet data that is left in the data communication terminal can be captured any time during the period before transmission to anther data communication terminal. Then, the process proceeds to S2311.

At S2311, control unit 402 carries out a process preventing the pet data stored in the main storage unit from being transmitted to another data communication terminal. Control unit 402 renders the flag to a set state to lock the data.

Following the above process, the process returns to S2301 to enter an event standby state.

At S2312, control unit 402 carries out a process corresponding to the occurrence of "leaving pet data" through a user's input as the event. The pet data captured in the data communication terminal can be set free to be left. Then, the process proceeds to S2313.

At S2313, control unit 402 resets the flag of locking the data since the pet data stored in the main storage unit may be transmitted to another data communication terminal. Following the above process, the process returns to S2301 to enter an event standby state.

At S2314, control unit 402 carries out a process corresponding to the occurrence of "take care of pet data" through a user's input as the event. When pet data is captured in the data communication terminal, the pet data can be taken care of.

Figure 21:
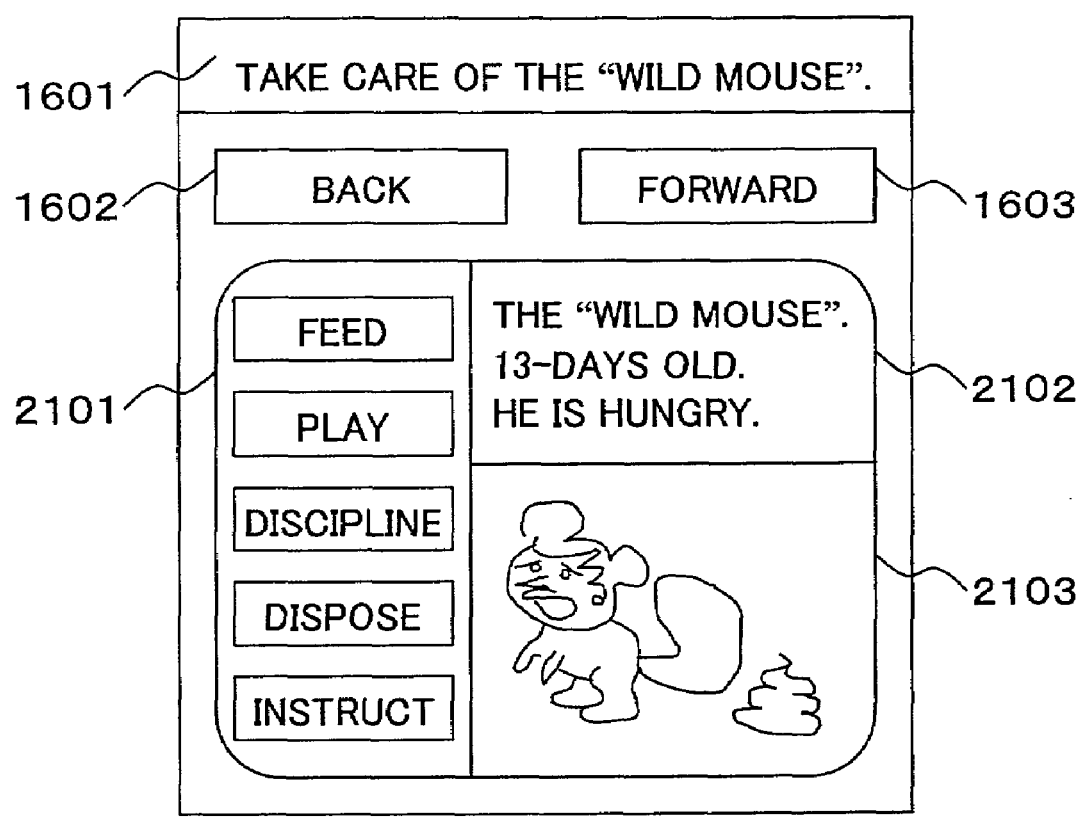

FIG. 21 shows the display unit of a data communication terminal when "take care" is selected from display unit 1602 of FIG. 20. The message of "take care of wild mouse" is provided at display unit 1601. The action of "back" or "forward" can be selected through display units 1602 and 1603.

A menu to take care of the virtual pet is displayed at display unit 2101. This includes "feed", "play", "discipline", "dispose" and "instruct", for example. These actions can be selected by the GUI of display unit 2101. Upon execution of the selected action, the contents of the virtual pet data are modified.

The status of the virtual pet is displayed in text format in display unit 2102. For example "wild mouse, 13-days old, hungry" is provided. The virtual pet is displayed graphically in display unit 2103. For example, the appearance of the virtual pet, food, or discharges are displayed. Then, the process proceeds to S2315.

At S2315, the process is branched according to an input through the screen of taking care of the virtual pet shown in FIG. 21.

At S2316, control unit 402 carries out the process corresponding to the selected "back" in FIG. 21. In this case, the screen of FIG. 20 is provided. Then, the process returns to S2301 to enter an event standby state.

At S2317, control unit 402 carries out the process corresponding to the selection of "forward" in FIG. 21. In this case, the virtual pet data is transmitted to a household appliance capable of virtual pet data reception. Then, the process proceeds to S2318.

At S2318, control unit 402 transmits data according to the process of S1013 of FIG. 10 with respect to the household appliance capable of receiving virtual pet data. When transmission is completed, the pet data is erased from the main storage unit of the data communication terminal. FIG. 22 corresponds to the case of transferring virtual pet data to a household apparatus from the data communication terminal. The virtual pet data stored in data communication terminal 2201 is transmitted to a television 2203 in response to a command by an individual 2202. Individual 2202 moves data communication terminal 2201 close to television 2203 and selects "forward" through display unit 1603 of FIG. 21, whereby the virtual pet data is transferred from the data communication terminal to the television.

In the present invention, desired virtual pet data can be locked to prevent transfer to another data communication terminal when the virtual pet data drops in. When the number of favored data increases so that the number of locked data arrives at the total number of data that can be saved, the virtual pet data is to be transferred to a household apparatus. Accordingly, new pet data can be received without discarding the current data even if the number of data that can be stored in the data communication terminal is limited.

By establishing a network for the household apparatus, pet data can be transferred among data communication devices connected to the network.

Following the above process, the process returns to S2301 to enter an event standby state.

At S2319, control unit 420 carries out a process corresponding to the selection of any of "feed", "play", "discipline", "dispose" and "instruct" in FIG. 21. Then, the process proceeds to S2320.

At S2320, control unit 402 updates the pet data according to the contents of taking care of the selected pet data selected at S2319.

Following above process, the process returns to S2315 to enter a user input standby state.

The data transmitted according to the data communication method of the present invention can have the data expiration date and the number of data valid transmissions set. Data with the expired expiration date, and data already transferred for the number of times of data valid transmissions are deleted. This delete implies the death of the virtual pet.

The expiration date of data and the number of data valid transmissions can be altered by the user. For example, the expiration date of data is extended/the number of data valid transmissions increases, if the user looks after the virtual pet with care. In contrast, the data expiration date/number of data valid transmissions will decrease if care is not taken. Accordingly, the virtual pet will live a long life, or die rather soon.

In the present embodiment, a select circuit selecting data to be transmitted from a plurality of data stored in main storage unit 405 can be provided in the data communication device or the data communication terminal.

The select circuit selects data to be transmitted based on data input by the user through input unit 401. More specifically, when a plurality of virtual pet data are stored in main storage unit 405 as shown in FIG. 19, selection of "leave pet data" by the user causes the select circuit to select that virtual pet data as data to be transmitted. Accordingly, the user can select data to be transmitted from a plurality of data stored in main storage unit 405.

The select circuit can randomly select data to be transmitted from a plurality of data stored in main storage unit 405. It is assumed that there are a plurality of virtual pets determined as "escaped" as a result of the user neglecting to take care of the pet corresponding to the virtual pet data stored in main storage unit 405. The select circuit randomly selects data to be transmitted from the plurality of virtual pet data. Accordingly, the data to be transmitted from the data stored in main storage unit 405 can be selected randomly.

The select circuit can select the data to be transmitted according to the contents of data from the data stored in main storage unit 405. According to the level of intimacy or hunger corrected in response to a user's input such as "take care", the select circuit selects the data to be transmitted. For example, the select circuit selects the data of a virtual pet that has the lowest level of intimacy as the data to be transmitted. Thus, the standard of selecting data to be transmitted is made apparent to the user.

By transmitting and receiving virtual pet data using the data communication device or data communication terminal of the present invention, data communication without leaving a duplicate of data can be realized in a plurality of data communication devices and data communication terminals. Virtual pet can move among a plurality of data communication devices or data communication terminals.

The data communication method of the present invention is applicable to embodiments other than the above-described embodiment in which appendix data is data representing a virtual character. For example, consider the case where a user operates a trading card game at the data communication terminal. In this case, appendix data is data representing cards used in this game. By transmitting and receiving the appendix data among the users of the communication terminal, cards used in the game executed by the communication terminals can be exchanged. Also, a rare card of high value can be distributed by the electronic lottery system. Furthermore, appendix data may be data representing a coupon that can be exchanged with a real object or that can be exchanged with real money. In such embodiments, presents can be exchanged using data representing coupons by transmitting and receiving appendix data among the users of the communication terminal.

Third Embodiment

An electronic lottery system using the data communication method of the present invention will be described with reference to FIGS. 24 to 30. This electronic lottery system issues many data, and then determines the winning data.

In the data communication method of the present invention, appendix data such as a flier is appended to the communication data. Alternatively, the number of transmissions of data among the data communication terminals and the like can be assigned to the transmitted data. Accordingly, an electronic lottery system that will be described afterwards can be built. The present embodiment is described in association with the embodiment of the above-described virtual pet data communication. However, the electronic lottery system of the present embodiment is not limited to being combined with the communication of the virtual pet data.

Display unit 1502 of data communication terminal 1501 of FIG. 15 is shown in FIGS. 24 to 30.

Figure 24:
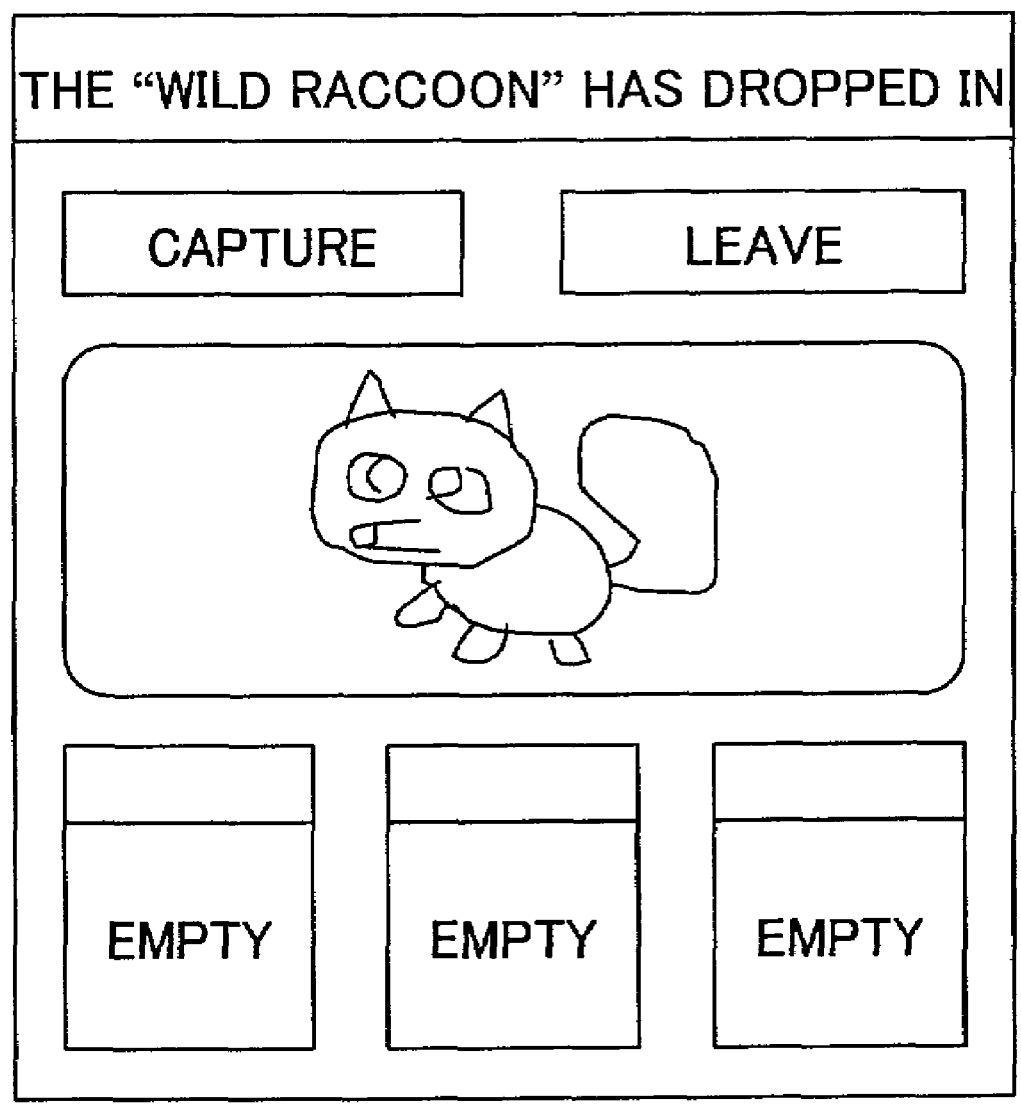
FIGS. 24 to 32 show examples of displays of a data communication terminal.

FIG. 24 shows the display unit of the data communication terminal when receiving virtual pet data "wild raccoon" from another data communication terminal or the like. When another data is appended to the received virtual pet data, the process proceeds to the display of FIG. 25.

Figure 25:
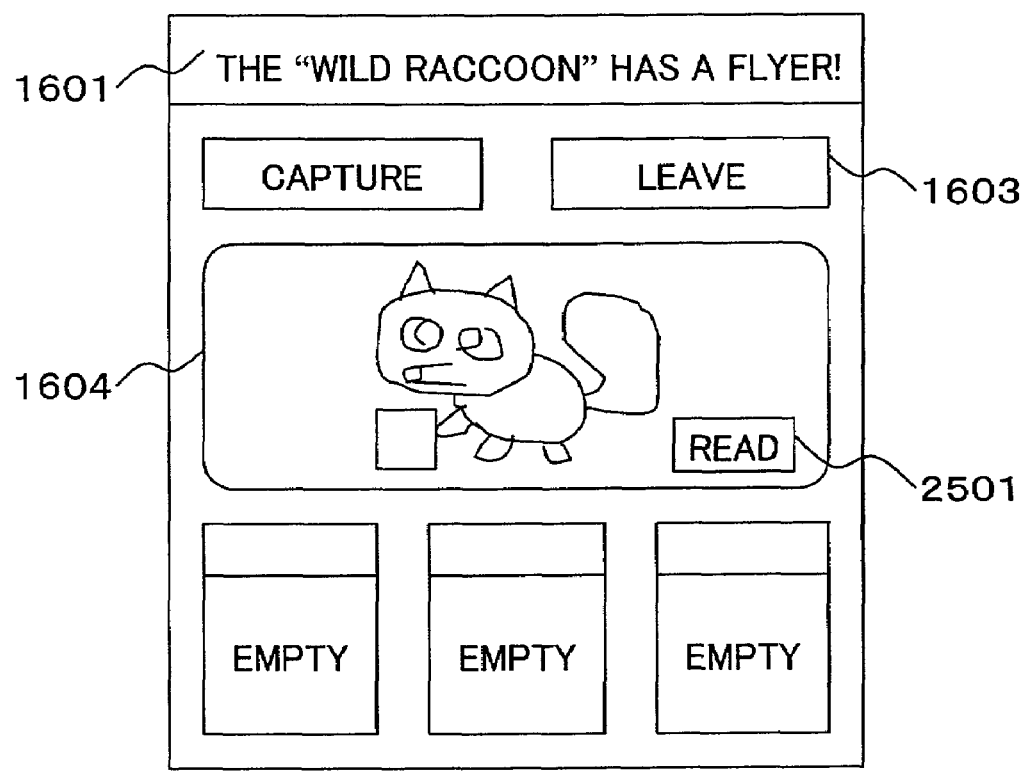

FIG. 25 shows the display unit of the data communication terminal when virtual pet data with appendix data is received.

The message of "wild raccoon has a flier" is provided in display unit 1601. The virtual pet "wild raccoon" is displayed with a flier in its hand in display unit 1604.

The action of "read" can be selected through display unit 2501. Upon selecting the action "read" through display unit 2501, the display of FIG. 26 is provided.

Figure 26:
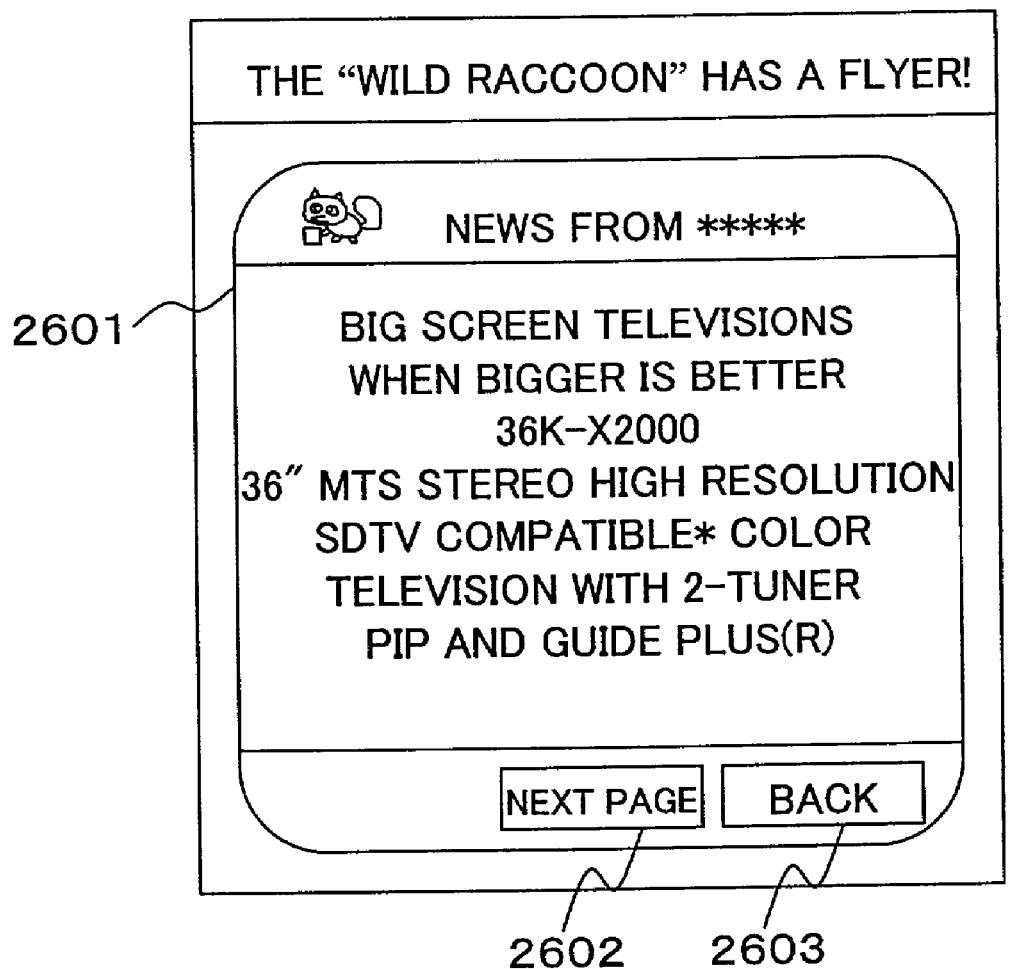
Figure 27:
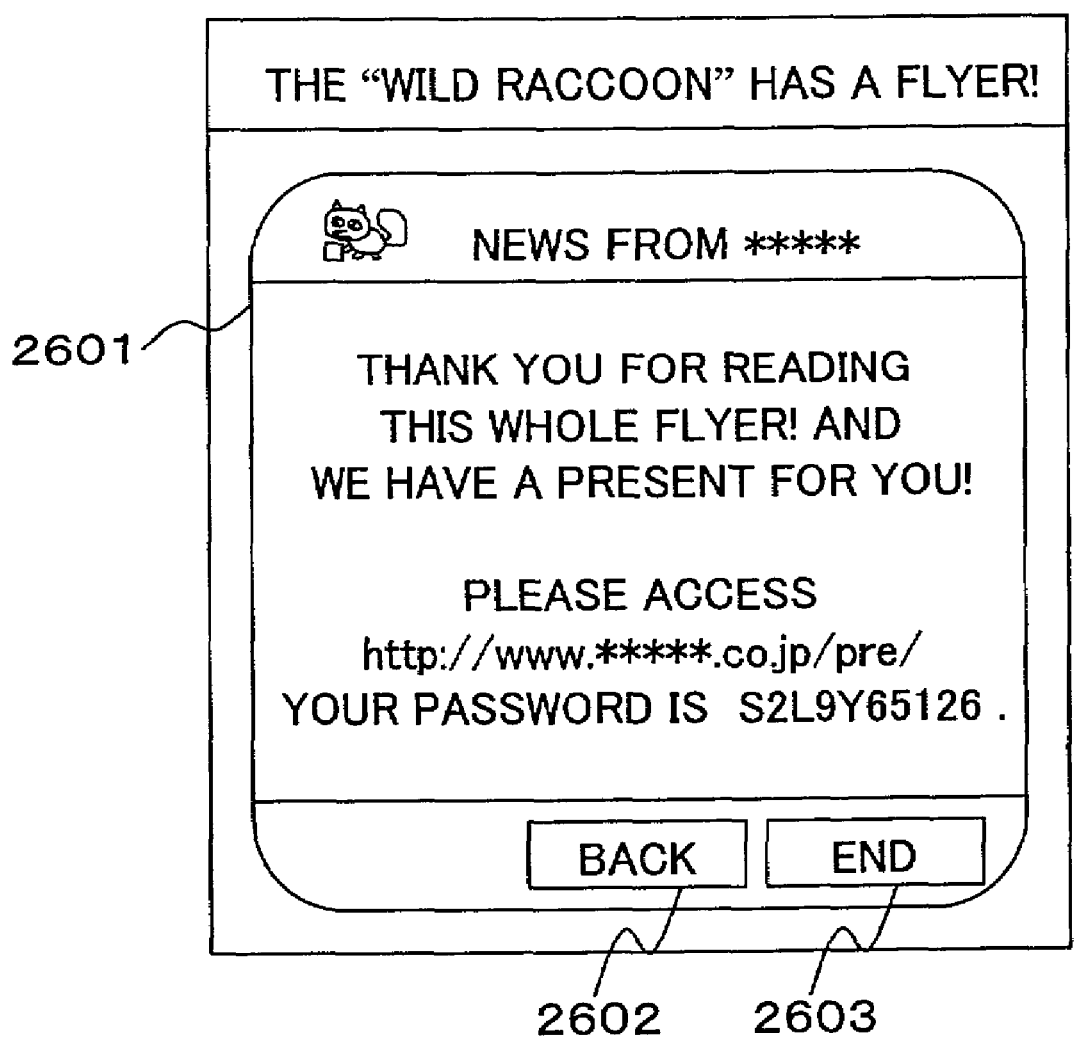

FIG. 26 shows the display unit of the data communication terminal displaying data appended to the virtual pet data. The contents of the appendix data is shown in the region of display unit 2601. The actions of "next page" or "back" can be selected through display units 2602 and 2603, respectively. When the action of "next page" is selected through display unit 2602, the display of FIG. 27 is provided. When the action of "back" is selected through display unit 2603, the display of FIG. 25 is provided.

FIG. 27 shows the display unit of the data communication terminal when the data appended to the virtual pet data is displayed. FIG. 27 provides a display of the continuation of the data that could not be displayed in FIG. 26 is provided. The actions of "back" or "end" can be selected through display units 2602 and 2603, respectively. When the action of "back" is selected through display unit 2602, the display of FIG. 26 is provided. When the action of "end" is selected through display unit 2603, the display of FIG. 28 is provided.

The latter part of data appended to the virtual pet data is shown in display unit 2601. The URL (Uniform Resource Locator) and password of the home page are displayed. The user of the data communication terminal accesses the home page corresponding to the displayed URL and enters the password to receive the service so as to obtain a present or the like.

Figure 28:
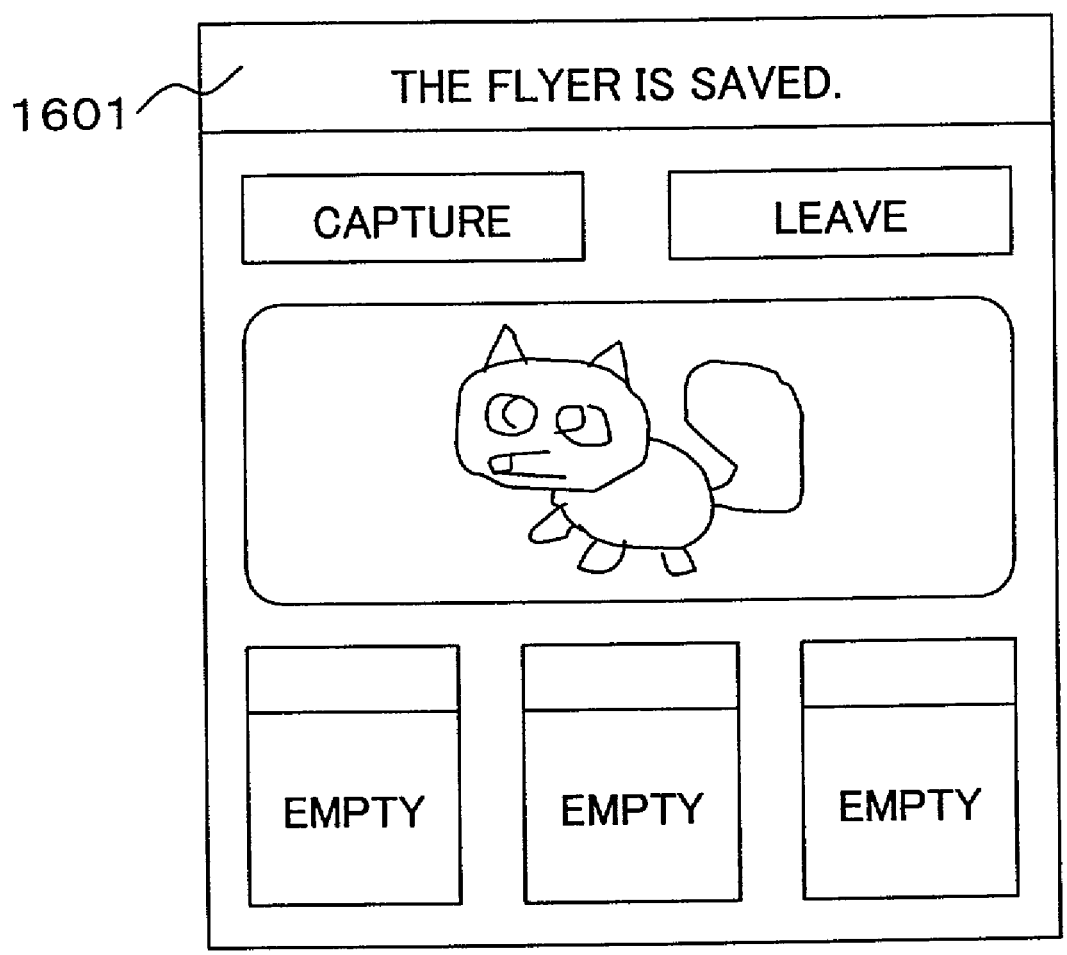

FIG. 28 shows the display unit when "end" is selected through display unit 2603 in FIG. 27. The display of "flier has been saved" is provided in display unit 1601. This means that the data appended to the virtual pet data has been detached from the virtual pet data and stored in the main storage unit. The display of FIG. 28 changes to the display of FIG. 29 at an elapse of a predetermined time.

Figure 29:
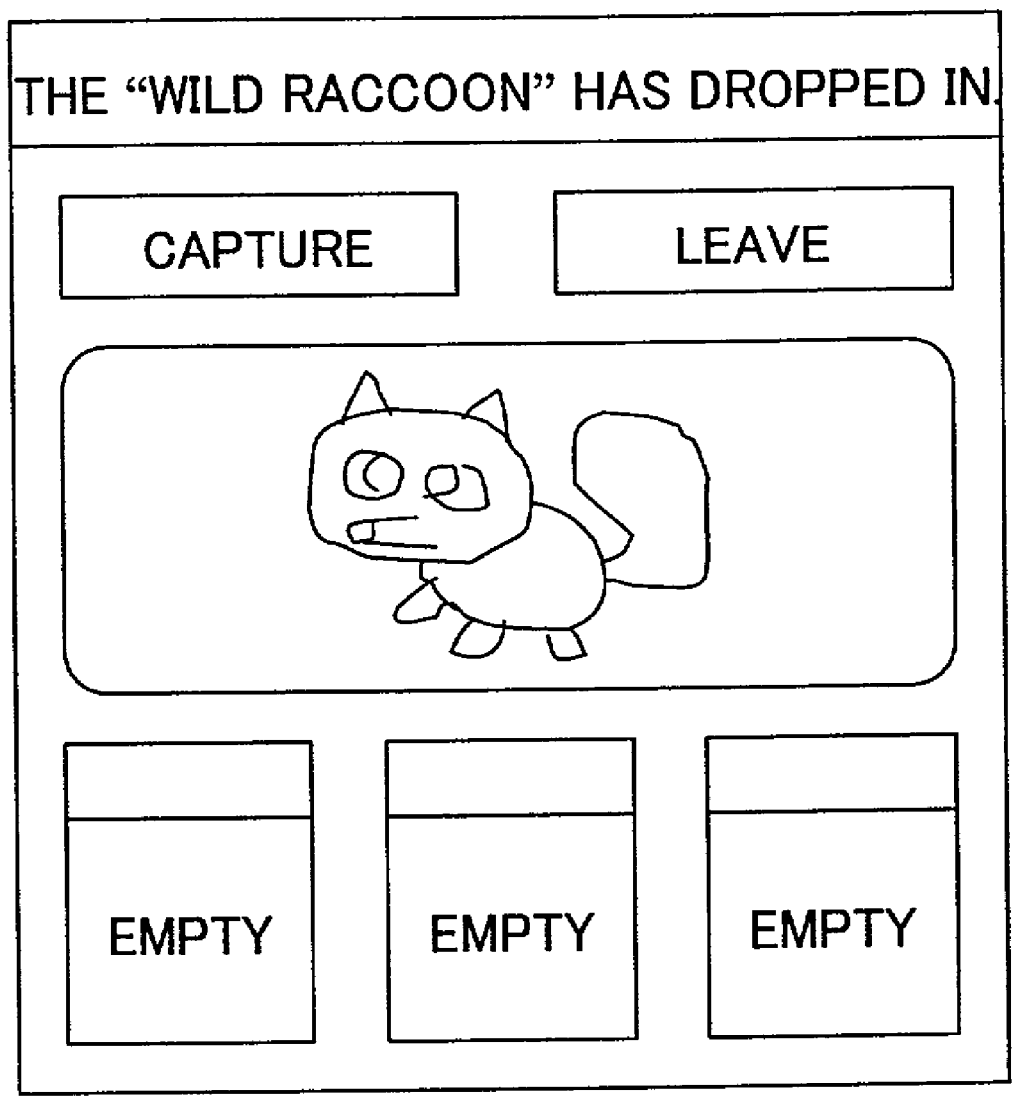
Figure 30:
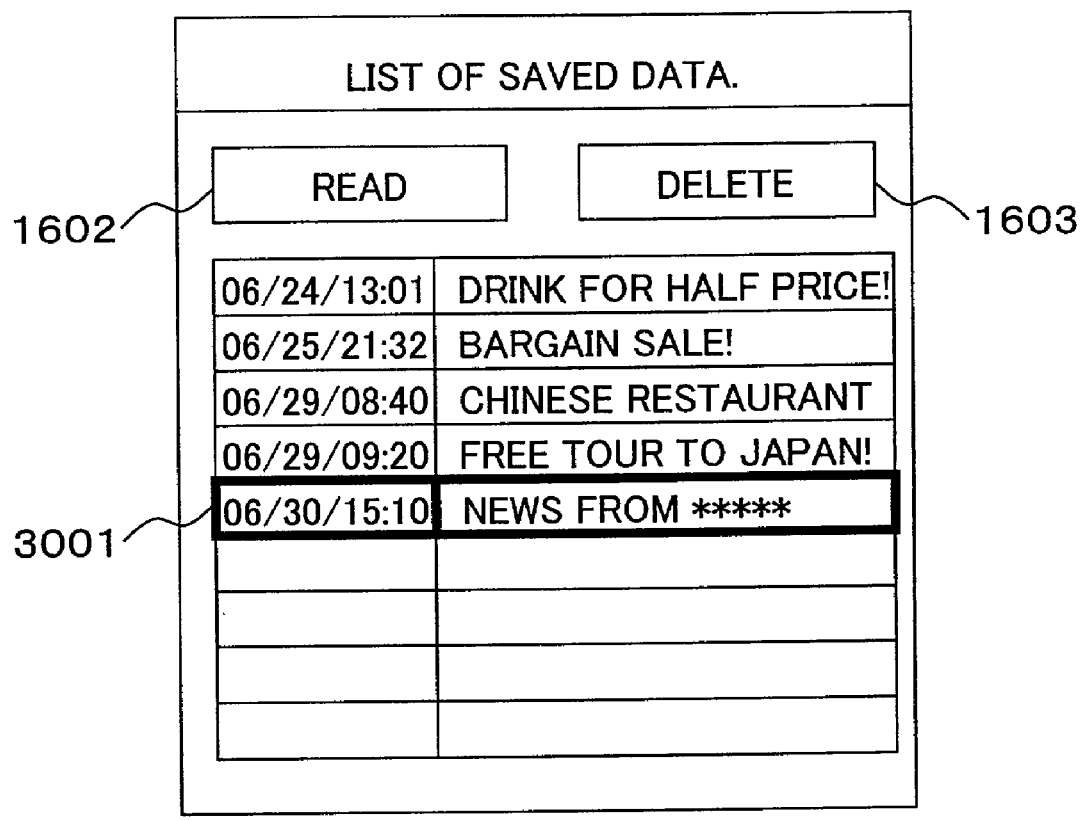

FIG. 29 shows the display when the virtual pet data that does not have appendix data arrives at the data communication terminal. By using hard button 1503 of FIG. 15 in the data communication terminal, the display of FIG. 30 can be provided. FIG. 30 shows a list of appendix data of the virtual pet stored in the data communication terminal. The region surrounded by a bold frame in display unit 3001 corresponds to the selected data. By selecting the action of "read" or "delete" through the GUI of display units 1601 and 1603, the contents of data can be displayed or deleted.

"End" button 2603 in FIG. 27 must be selected in order to store the appendix data in a detached manner from the virtual pet data in the data communication terminal. If this operation is not conducted, the appendix data is moved together when the virtual pet data is transferred to another terminal or the like.

According to the data communication method of the present invention, a duplicate of data will not be saved in a plurality of apparatuses in the communication process. Since prediction of which data communication terminal the data arrives at cannot be made in advance, the service of a lottery system to provide a present can be realized.

Fourth Embodiment

Figure 31:
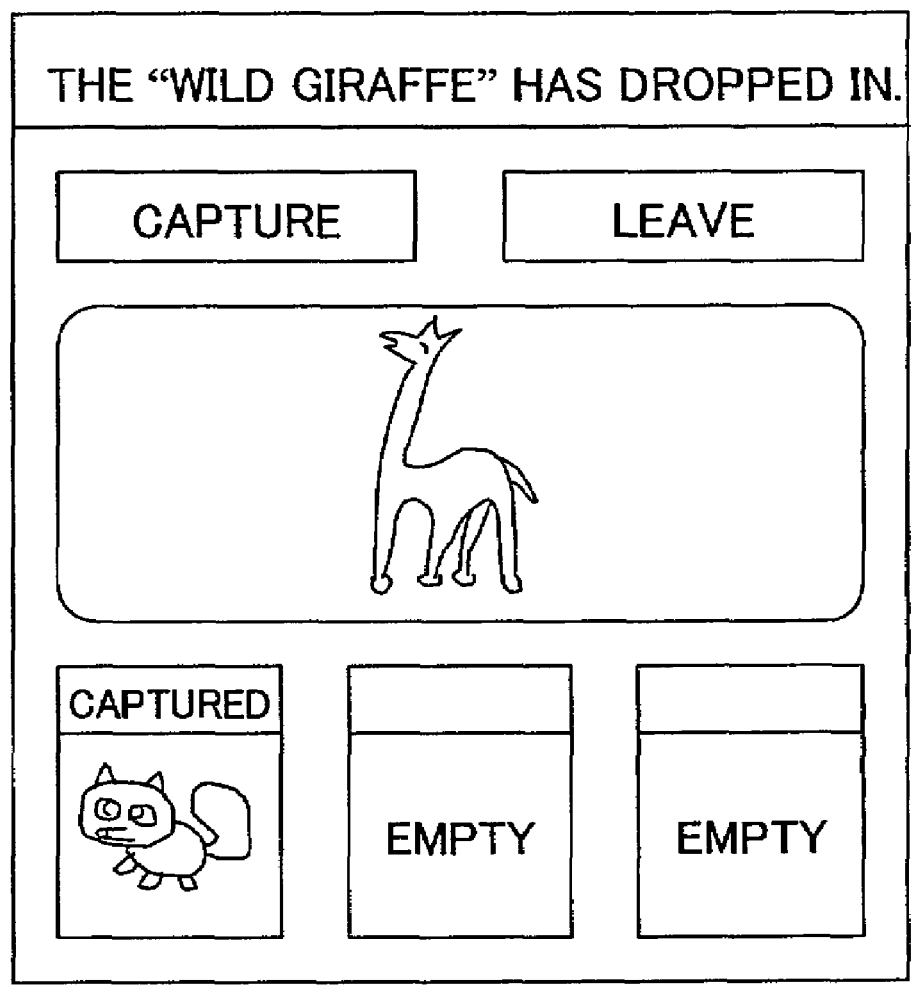
Figure 32:
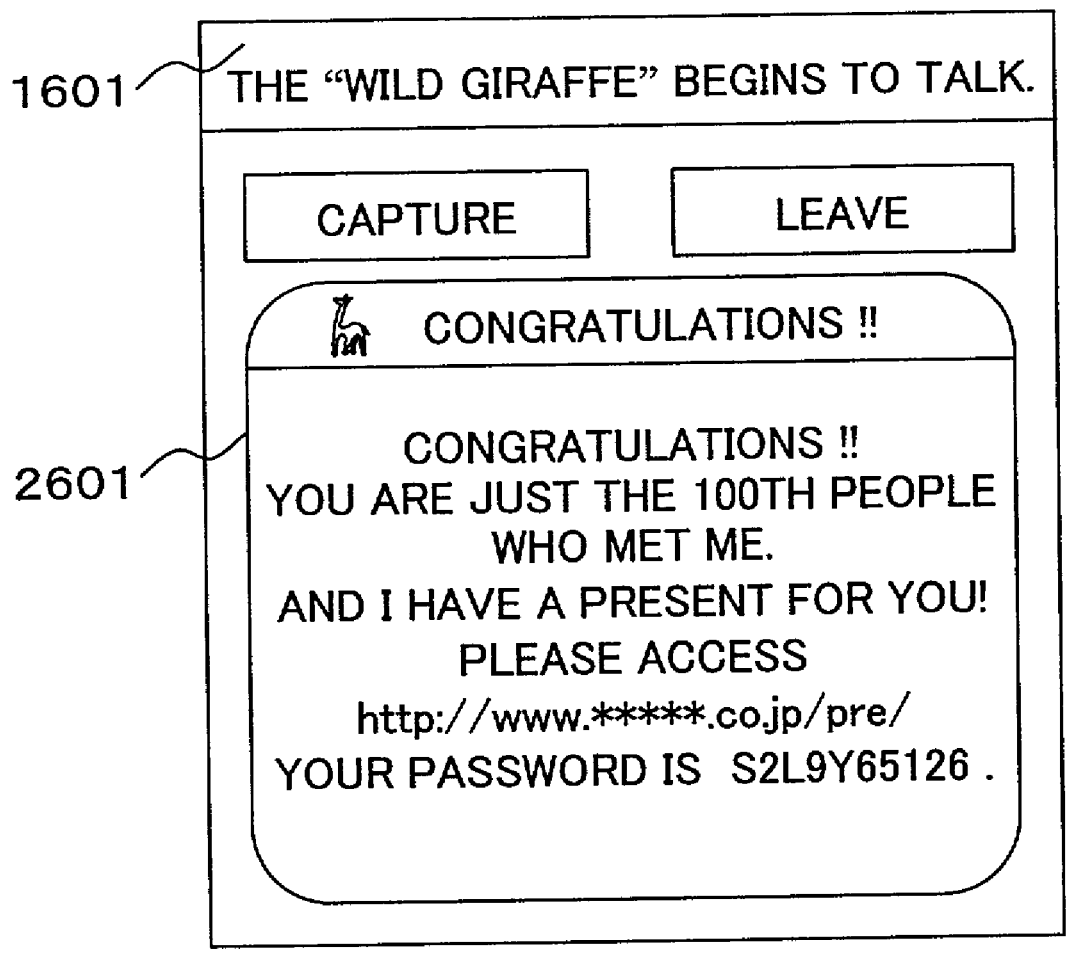

An electronic lottery system of the present embodiment displayed with reference to FIGS. 31 to 32 can also be realized. This electronic lottery system draws lots based on the number of transmissions of data. It is assumed that the appendix data includes the virtual pet data, the number of transmissions among apparatuses, and the preset number of transmissions, and the virtual pet data includes data for displaying pet and data for the electronic lottery system.

FIG. 31 shows a display when the data communication terminal receives virtual pet data. When the number of transmissions among apparatuses matches the preset number of transmissions, the display of FIG. 32 is provided.

In the present embodiment, the virtual pet data is named "wild giraffe". The preset number of transmissions is 100. The present embodiment corresponds to the case where the number of transmissions among apparatuses has just become 100 by the current data transmission.

As shown in FIG. 32, "wild giraffe begins to talk!" is provided in display unit 1601. A message indicating that the current display transmission is the 100th transmission is displayed together with the URL and password of the home page in display unit 2601. A display determined by the data appended to the virtual pet data is provided on display unit 2601.

The user of the data communication terminal can enjoy the service of receiving a present or the like by accessing the home page corresponding to the displayed URL and entering a password.

At this current stage, the data for displaying a pet of the virtual pet data is detached from the data for the electronic lottery system, and the data for the lottery system is stored in the main storage unit of the data communication terminal. Therefore, the data for the lottery system will no longer be transferred to another data communication terminal.

Thus, the service of a random lottery system to provide a present can be realized since a duplicate of data will not be stored in a plurality of apparatuses during the communication process, and prediction of which data communication terminal receives the data cannot be made.

Fifth Embodiment

Figure 33:
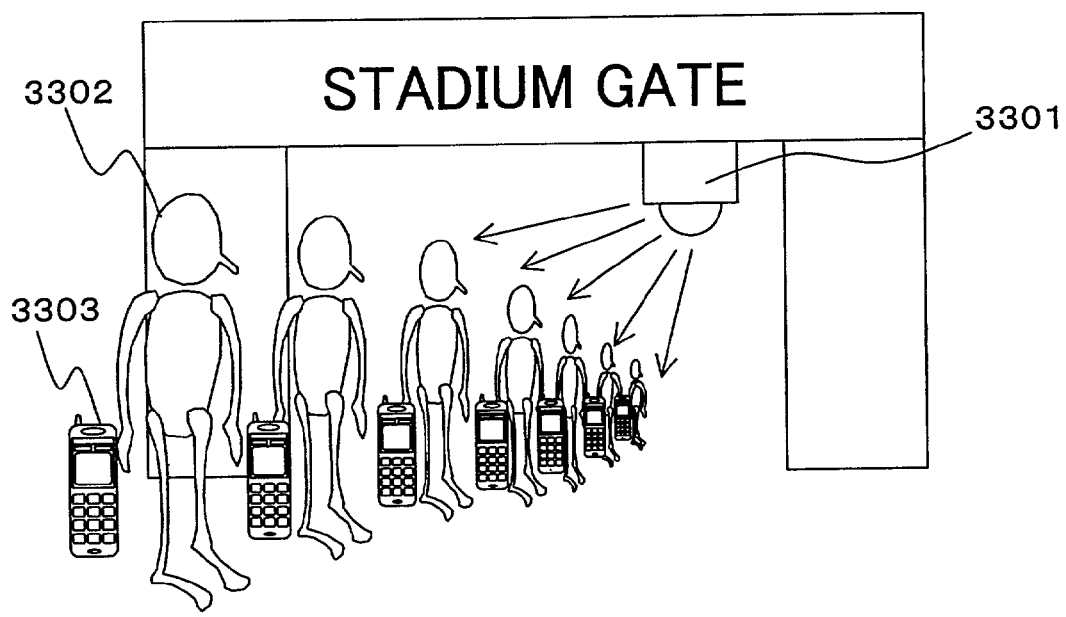
FIG. 33 shows an entrance gate of a stadium.
Figure 34:
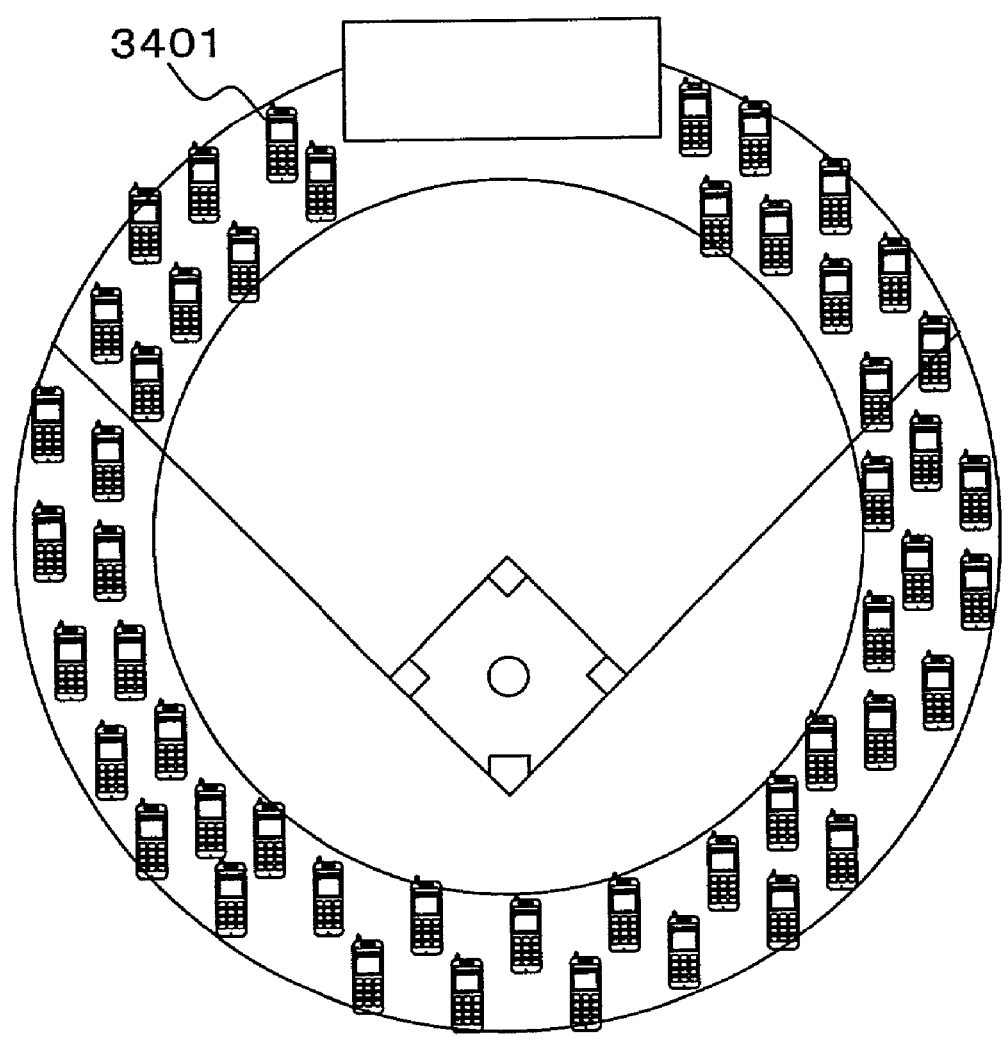
FIG. 34 shows a stadium viewed from above.

An electronic lottery system can be realized in a stadium or the like as shown in FIG. 33 and FIG. 34 by using the data communication method of the present invention.

FIG. 33 shows the entrance gate of a stadium. A data communication device 3301 that carries out only data transmission is installed at the entrance gate. The person represented as individual 3302 is admitted into the stadium. Each person carries a data communication terminal represented as data communication terminal 3303.

Data communication device 3301 transmits unduplicated data to each data communication terminal 3303 passing through the entrance gate.

FIG. 34 shows the stadium when viewed from above. There are many data communication terminals in the audience represented by data communication terminal 3401. The data received at the entrance gate is sequentially transmitted among these data communication terminals.

However, a loop in which the same data moves between the same terminals must be avoided. Therefore, each data communication terminal is assigned a unique ID. The transferred data includes the ID list of apparatuses recently dropped in. In this ID list, the IDs of five apparatuses, for example, recently dropped including the apparatus with the current data are provided. These IDs are sequentially updated according to the transmission of data among the apparatuses.

In the communication between terminals, data transmission is suppressed when the ID of the reception side terminal is found in the ID list of apparatuses recently dropped stored in the transmission side terminal. As a result, occurrence of a loop of data between the same terminals can be avoided.

In practice, the name of the "winning" data is announced at the end of the game played at the stadium, for example. A present can be provided to the user of the data communication terminal with the "winning" data at the current stage.

Thus, each data transmitted according to the data communication method of the present invention is assigned an ID. The same data will not be diffused among the apparatuses to be spread out since the data moves among apparatuses without leaving a duplicate thereof. Thus, one data communication terminal can be selected from a plurality of data communication terminals.

Sixth Embodiment

An electronic mail effected by the data communication method of the present invention is not delivered to an addressed destination by passing through a predetermined path as in the conventional electronic mail. Even if the ID of the destination apparatus is set in the data, it is impossible to predict whether the data will arrive at the destination since data moves through a path that changes dynamically according to the movement of the person carrying the data communication terminal. Therefore, an electronic mail system that could not be realized in the conventional systems can be built by the data communication method of the present invention.

Figure 35:
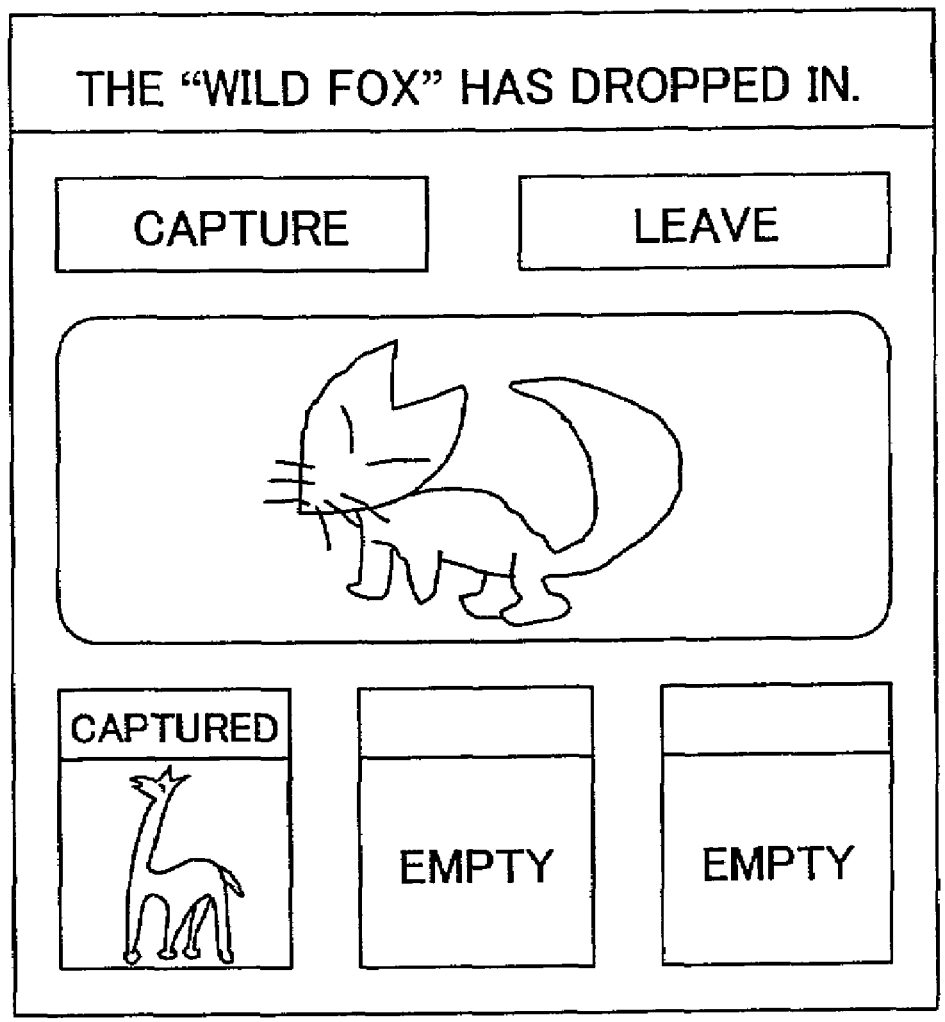
FIGS. 35 and 36 show examples of displays of a data communication terminal.
Figure 36:
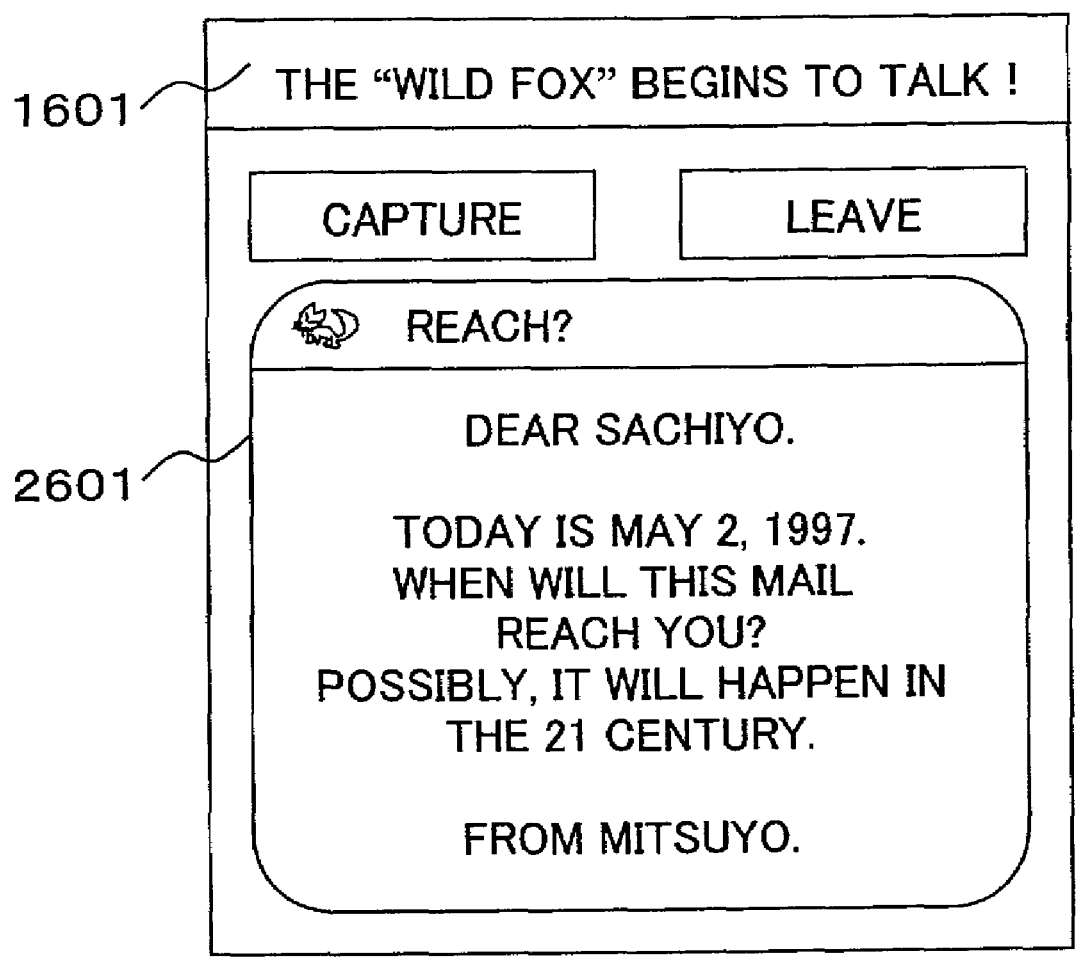

FIG. 35 shows a display when a data communication terminal receives virtual pet data. When the destination apparatus ID applied in the data matches the ID of the data communication terminal receiving the data, the display of FIG. 36 is provided.

In the present embodiment, the virtual pet data is named "wild fox". Referring to FIG. 36, the message of "wild fox begins to talk!" is provided in display 1601. The mail text attached to the virtual pet data is displayed in display unit 2601.

In order to send an electronic mail according to the data communication method of the present invention, the mail text is generated using the data communication terminal and the destination apparatus ID is specified. The data communication terminal is left in a state where data is not locked.

Accordingly, the data moves along the data communication system developed by many data communication terminals. If lucky, the data arrives at the desired destination terminal.

Thus, data is assigned with a destination apparatus ID and transmitted according to the data communication method of the present invention. The data moving among the data communication terminals without being duplicated is displayed only when a data communication terminal having an ID that matches the destination apparatus ID receives the data. By this system, it is possible to try one's luck based on whether the electronic mail arrives or not at a predetermined destination.

Seventh Embodiment

In the electronic lottery system of the third embodiment, appendix data such as a flier appended to the virtual pet data must be replenished appropriately. This is because the advertisement information in the flier becomes outdated. The present embodiment is directed to a data communication system including a data transfer device replenishing appendix data when data is to be transferred.

Figure 37:
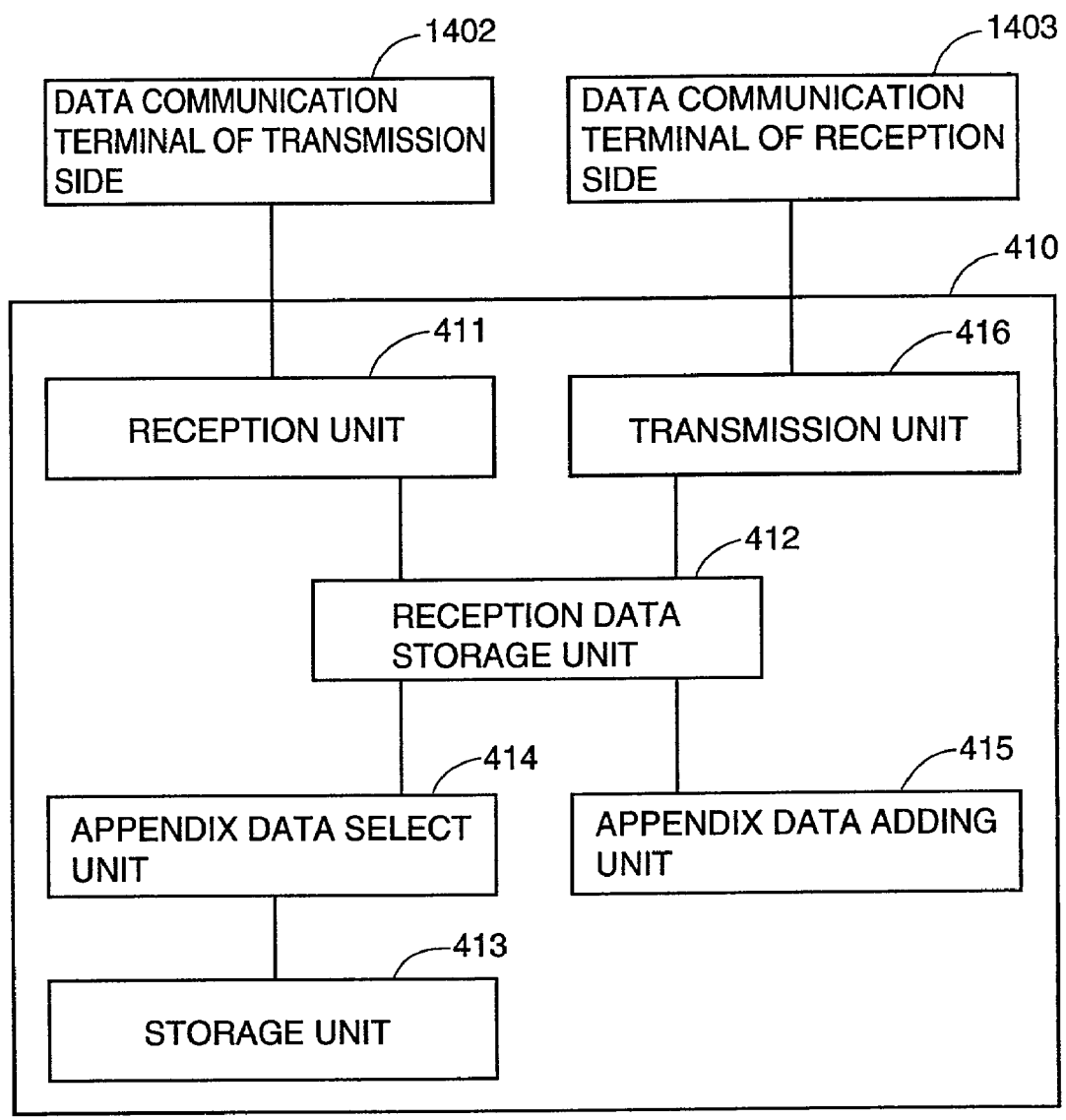
FIGS. 37 and 38 are block diagrams of a data transfer device of the present invention.

FIG. 37 is a control block diagram of a data transfer device of the present embodiment. A data transfer device 410 is connected so that communication with a data communication terminal 1402 of the transmission side and a data communication terminal 1403 of the reception side shown in FIG. 14 is allowed. Data transfer device 410 replenishes the appendix data in the data received from data communication terminal 1402 of the transmission side, and transfers the data to data communication terminal 1403 of the reception side. The data communication terminal communicating with data transfer device 410 is not limited to data communication terminal 1402 and data communication terminal 1403. The data communication device and the data communication terminal capable of data transmission and reception of the previous embodiments can be employed.

Referring to FIG. 37, data transfer device 410 includes a reception unit 411 receiving data from data communication terminal 1402 of the transmission side, a reception data storage unit 412 connected to reception unit 411 to store temporarily the received data, a storage unit 413 storing appendix data, an appendix data select unit 414 connected to reception data storage unit 412 and storage unit 413 to select appendix data, an appendix data adding unit 415 connected to reception data storage unit 412 and appendix data select unit 414 to append the appendix data selected by appendix data select unit 414 to the received data, and a transmission unit 416 connected to reception data storage unit 412 to transmit the data together with the appendix data to data communication terminal 1403 of the reception side.

Reception data storage unit 412 can store single data or a plurality of data. In the case where only one data can be stored and there is already data stored received by reception data storage unit 412, data transfer device 410 disables data reception from transmission side data communication terminal 1402 even if data communication terminal 1402 of the transmission side enters the range where communication is allowed. In the case where a plurality of data can be stored, data transfer device 410 selects one data according to a predetermined condition from the plurality of data for the replenishment of the appendix data. The data is transmitted to data communication terminal 1403 of the reception side. Here, data transfer device 410 can select randomly data to be transmitted from the plurality of data stored in reception data storage unit 412 or select data according to the time of storage thereof. Furthermore, data transfer device 410 can select data to be transmitted according to the contents of the stored data (for example, type of virtual character).

Upon detecting that appendix data is not appended to the received data stored in reception data storage unit 412, appendix data select unit 414 selects appendix data to be replenished from the appendix data stored in storage unit 413. When appendix data representing a virtual character is not appended here, appendix data select unit 414 selects appendix data representing a virtual character. In the case where appendix data representing a virtual character is appended and data representing a flier is not appended, appendix data select unit 414 selects the appendix data representing a flier or the like.

Storage unit 413 storing appendix data can be provided in a device connected via the network instead of in data transfer device 410. In this case, the appendix data is transmitted from the another device and received by data transfer device 410.

The process of replenishing appendix data executed by data transfer device 410 will be described hereinafter.

It is assumed that data communication terminal 1402 of the transmission side is located in a range where communication with data transfer device 410 is allowed. According to the flow chart of FIG. 6, when determination is made that data transmission is possible, data communication terminal 1402 of the transmission side transmits data to data transfer device 410. The transmitted data is received by data reception unit 411 and stored in reception data storage unit 412.

Appendix data select unit 414 refers to the data stored in reception data storage unit 412. When appendix data is not included in the received data, or when appendix data representing only a virtual character is included in the received data, appendix data select unit 414 selects the appendix data representing a virtual character or a flier from storage unit 413. Selection of appendix data can be carried out randomly from the appendix data stored in storage unit 413 or according to a predetermined order. Also, appendix data can be stored in storage unit 413 in correspondence with the type of the virtual character, so that appendix data such as a flier corresponding to the type of the virtual character represented by the appendix data included in the reception data stored in reception data storage unit 412 is selected.

Appendix data adding unit 415 replenishes the appendix data selected by appendix data select unit 414 to the reception data stored in reception data storage unit 412.

It is assumed that data communication terminal 1403 of the reception side now enters a range where communication with data transfer device 410 is allowed. According to the flow chart of FIG. 6, data communication terminal 1403 of the reception side determines whether data reception is possible or not. When determination is made that data is stored in reception data storage unit 412, data transfer device 410 transmits data to data communication terminal 1403 of the reception side. Following transmission of data to data communication terminal 1403 of the reception side, data transfer device 410 deletes the transmitted data from reception data storage unit 412. The data transmitted from data transfer device 410 to data communication terminal 1403 of the reception side is stored in main storage unit 405 of the data communication terminal.

Thus, in the case where appendix data is removed by the user, the appendix data can be replenished by transmission/reception using the data communication device or the data communication terminal of the present invention. In the case of appendix data representing only a virtual character is appended in the data, appendix data of a flier or the like corresponding to the type of the virtual character can be replenished by the same way.

Eighth Embodiment

In the electronic lottery system of the previous fifth embodiment, the method of avoiding repeated reception of the same data by the same data communication terminal has been described by employing "ID list of apparatuses recently dropped" as history data. The present eighth embodiment is directed to data differing in the received number of times (the number of apparatuses recently dropped in) according to the type of data that is transmitted/received.

Figure 38:
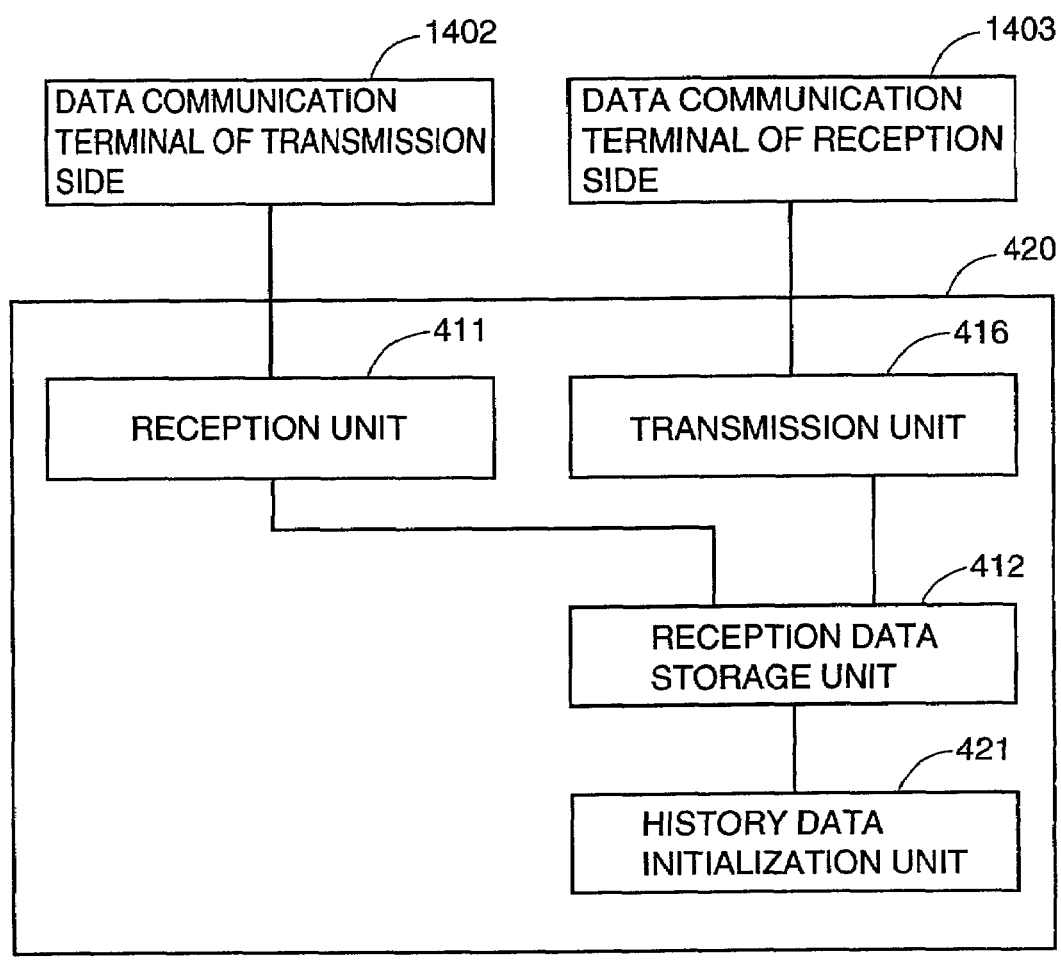

FIG. 38 is a control block diagram of a data transfer device of the present embodiment. A data transfer device 420 is connected so as to allow communication with a data communication terminal 1402 of the transmission side and a data communication terminal 1430 of the reception side shown in FIG. 14. Data transfer device 420 initializes the history data of the data received from data communication terminal 1402 of the transmission side to transfer data to data communication terminal 1403 of the reception side. In the present embodiment, detailed description of components identical to those of the previous seventh embodiments will not be repeated where appropriate.

Referring to FIG. 38, data transfer device 420 includes a reception unit 411 to receive data from data communication terminal 1402 of the transmission side, a reception data storage unit 412 connected to reception unit 411 to temporarily store the received data, a transmission unit 416 connected to reception data storage unit 412 to transmit the data having history data initialized to data communication terminal 1403 of the reception side, and a history data initialization unit 421 connected to reception data storage unit 412 to initialize the history data received from data communication terminal 1402 of the transmission side.

History data initialization unit 421 initializes the history data, when included in the reception data stored in reception data storage unit 412, in the case where history data satisfies a certain condition. The initialization method includes the method of deleting the entire history data, deleting apparatus IDs previously dropped in leaving a predetermined number of apparatus IDs in the list of apparatus ID recently dropped. Conditions for initialization include the condition of initializing only when a predetermined number of apparatus IDs are stored in the history data. For example, the method of initialization includes the step of deleting the oldest ten apparatus IDs from the fourteen apparatus IDs stored in the history data for initialization to the four apparatus IDs recently dropped in. As the condition for initialization, the condition of carrying out this initialization only when fifteen or more apparatus IDs are stored in the history data, for example, can be set.

When the history data represents the number of times data has passed through the data communication device or the data communication terminal, the method of initialization includes the method of rendering the number of apparatuses dropped in to 0 or to a random number. When the method of rendering the number of apparatuses dropped in to a random number is employed, aleatory is increased in the case of drawing lots based on the number of apparatuses dropped in of a data communication device or a data communication terminal in the previous fourth embodiment.

The history data initialization process executed in the data transfer device will be described hereinafter.

It is assumed that data communication terminal 1402 of the transmission side is located in a range where communication with data transfer device 420 is allowed. According to the flow chart of FIG. 6, when determination is made that data transmission is possible, data communication terminal 1402 of the transmission side transmits data to data transfer device 420. The transmitted data is received by data reception unit 411. The received data is stored in reception data storage unit 412.

History data initialization unit 421 refers to the data stored in reception data storage unit 412. When history data is included in the received data, that history data is initialized by the aforementioned initialization method.

It is assumed that data communication terminal 1403 of the reception side enters a range where communication with data transfer device 420 is allowed. According to the flow chart of FIG. 6, when determination is made that data communication terminal 1403 of the reception side is capable of data reception and data is stored in reception data storage unit 412, data transfer device 420 transmits data to data communication terminal 1403 of the reception side. Upon data transmission to data communication terminal 1403 of the reception side, data transfer device 420 deletes the transmitted data from reception data storage unit 412. The data transmitted from data transfer device 420 to data communication terminal 1403 of the reception side is stored in main storage unit 405 of the data communication terminal.

Thus, in the data transmission/reception using a data communication device or a data communication terminal of the present invention, history data included in the transmitted/received data can be initialized according to the contents of data. For example, in the case where the user of a data communication device or a data communication terminal transmits/receives data included in an electronic bulletin that accumulates messages, initialization is effected frequently (initialization effected even when there are few apparatus IDs stored in history data) to allow the same data communication device or the same data communication terminal to receive data at reasonable intervals.

History data initialization unit 421 can include an analyze unit analyzing the position of a data communication terminal based on an apparatus ID and the time of receiving data from that apparatus ID included in the history data prior to initialization. Accordingly, the position of a data communication terminal at a particular time can be analyzed based on the history data prior to initialization.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data communication device for data communication with a plurality of other data communication devices, comprising:
   a reception circuit receiving data,
   a storage circuit connected to said reception circuit, storing said received data,
   a transmission circuit connected to said storage circuit, transmitting an announce signal to said plurality of other data communication devices within a communication range, and, upon receipt of a response to the announce signal by a second data communication device among said plurality of other data communication devices, transmitting said data stored in said storage circuit to the second data communication device,
   a control unit connected to said storage circuit, controlling said storage circuit so that upon transmission of the data stored in said storage circuit to the second data communication device, the transmitted data is deleted from said storage circuit,
   wherein said data includes appendix data stored so as to be displayed to a user of the second data communication device,
   a display circuit displaying said appendix data, wherein said appendix data includes data representing a virtual character, and
   a modify circuit modifying said appendix data so as to change the virtual character displayed at said display circuit.

2. The data communication device according to claim 1, wherein said control unit controls said reception circuit so that reception complete data representing reception of said data is received from said second data communication device, and data transmitted to said second data communication device is deleted in response to reception of said reception complete data.

3. The data communication device according to claim 1, further comprising an inquiry data transmission circuit transmitting inquiry data inquiring about whether reception of said data is possible or not to said second data communication device prior to transmitting said data, based on a predetermined condition,
   wherein said control unit controls said reception circuit so as to prepare for reception of said data in response to reception of said inquiry data.

4. The data communication device according to claim 3, further comprising a mode switch circuit switching an operation mode to a transmission mode transmitting data and to a reception mode receiving data,
   wherein said condition corresponds to storage of data to be transmitted to said second data communication device capable of communication therewith in said storage circuit and the operation mode of said data communication device being a transmission mode.

5. The data communication device according to claim 3, further comprising an identification data storage circuit storing identification data to identify said data,
   said data being received by said reception circuit via at least one of said plurality of data communication devices,
   said inquiry data including at least one of identification data to identify a data communication device through which data has passed before said data arrives at the data communication device transmitting said inquiry data,
   wherein said control unit includes a circuit rejecting reception of data when identification data stored in said identification data storage circuit is included in identification data included in said received inquiry data.

6. The data communication device according to claim 5, wherein said inquiry data includes a predetermined number of identification data to identify a data communication device through which data has passed before said data arrives at the data communication device transmitting said inquiry data.

7. The data communication device according to claim 1, wherein said control unit controls said transmission circuit so as to remove said appendix data from a transmission object to said second data communication device.

8. The data communication device according to claim 7, wherein said control unit controls said transmission circuit so as to include again into said transmission object said appendix data excluded from said transmission object.

9. The data communication device according to claim 1, wherein said data is received by said reception circuit via at least one of said plurality of data communication devices,
   said data communication device further comprising an inquiry data transmission circuit transmitting inquiry data inquiring about whether reception of said data is possible or not to said second data communication device prior to transmitting said data, based on a predetermined condition,
   said data including, in addition to said appendix data, history data representing at least one of said plurality of data communication devices through which data has passed before said data arrives at the data communication device transmitting said inquiry data,
   wherein said modify circuit includes a circuit modifying said appendix data based on history data.

10. The data communication device according to claim 9, wherein said history data is data representing the number of times said data has passed said data communication devices,
    wherein said modify circuit includes a circuit modifying said appendix data based on said number of times.

11. The data communication device according to claim 1, wherein said data is received by said reception circuit via at least one of said plurality of data communication devices,
    said data including history data representing at least one of said plurality of data communication devices through which data has passed before said data arrives at said data communication device transmitting said inquiry data,
    wherein said control unit determines whether to execute a predetermined process in said data communication device based on whether said history data satisfies a predetermined condition or not, and controlling said data communication device according to said determination.

12. The data communication device according to claim 11, wherein said history data representing the number of times said data has passed through said data communication devices, said control unit determining execution of said predetermined process when said number of times corresponds to a predetermined number.

13. The data communication device according to claim 1, further comprising:
an identification data storage circuit storing identification data to identify said data; and
a display circuit displaying received data,
wherein said transmission circuit includes a circuit transmitting data with identification data to said second data communication device,
said control unit controlling said display circuit so as to display received data when the identification data appended to the data received by said reception circuit matches the identification data stored in said identification data storage circuit.

14. The data communication device according to claim 13, further comprising an input circuit entering an identification data to identify a second data communication device to which data is to be transmitted from the data communication device.

15. The data communication device according to claim 1, wherein said storage circuit includes a circuit storing a plurality of said data,
said data communication device further comprising a select circuit connected to said storage circuit, selecting data from said plurality of data stored in said storage circuit,
wherein said transmission circuit includes a circuit transmitting said data selected by said select circuit.

16. The data communication device according to claim 1, further comprising:
an appendix data storage circuit storing appendix data: and
a control circuit connected to said storage circuit and said appendix data storage circuit, appending the appendix data stored in said appendix data storage circuit to said data and storing said data with said appended data in said storage circuit when said data stored in said storage circuit satisfies a predetermined condition.

17. The data communication device according to claim 3, wherein said data is received by said reception circuit via at least one of said plurality of data communication devices,
said data including history data representing a data communication device through which data has passed before said data arrives at the data communication device transmitting said inquiry data,
said data communication device further comprising a control circuit connected to said storage circuit, applying a predetermined process on history data stored in said storage circuit when said history data in said data stored in said storage circuit satisfies a predetermined condition.

18. The data communication device according to claim 17, wherein said control circuit includes a circuit initializing history data stored in said storage circuit when said history data in said data stored in said storage circuit satisfies a predetermined condition.

19. A data communication method for data communication between a first data communication device and a plurality of data communication devices, comprising:
receiving data at the first data communication device,
storing the received data,
transmitting an announce signal to a plurality of data communication devices within a communication range,
upon receipt of a response to the announce signal from a second data communication device among said plurality of data communication devices, transmitting the stored data to the second data communication device, and
upon transmission of the stored data to the second data communication device, deleting the stored transmitted data,
wherein said received data including appendix data stored so as to be displayed to a user of said second communication device,
said data communication method further comprising displaying said appendix data, and wherein said appendix data being data representing a virtual character,
said data communication method further comprising modifying said appendix data so as to change the virtual character displayed at the displaying of said appendix data.

20. The data communication method according to claim 19, further comprising receiving reception complete data representing reception of said data from said second data communication device,
wherein said deleting data includes deleting data transmitted to said second data communication device in response to reception of said reception complete data.

21. The data communication method according to claim 19, further comprising:
transmitting inquiry data inquiring about whether reception of said data is possible or not to said second data communication device, prior to transmitting said data, based on a predetermined condition, and
preparing reception of said data in response to reception of said inquiry data.

22. The data communication method according to claim 21, further comprising switching an operation mode to a transmission mode transmitting data and to a reception mode receiving data,
wherein said condition corresponds to storage of data to be transmitted to said second data communication device capable of communication therewith and the operation mode of said data communication device being a transmission mode.

23. The data communication method according to claim 21, further comprising preparing in advance identification data to identify said data communication device,
said data being received via at least one of said plurality of data communication devices,
said inquiry data including at least one identification data to identify a data communication device through which data has passed before said data arrives at the data communication device transmitting said inquiry data,
wherein said preparing reception includes rejecting reception of data when there is identification data prepared at the preparing in advance in the identification data included in said received inquiry data.

24. The data communication method according to claim 23, wherein said inquiry data including a predetermined number of identification data to identify a data communication device through which data has passed before said data arrives at the data communication device transmitting said inquiry data.

25. The data communication method according to claim 19, further comprising removing said appendix data from a transmission object to said second data communication device.

26. The data communication method according to claim 25, further comprising including again in said transmission object said appendix data removed from said transmission object.

27. The data communication method according to claim 19, wherein said data being received via at least one of said plurality of data communication devices, said data communication method further comprising transmitting inquiry data inquiring about whether reception of said data is possible or not to said second data communication device prior to transmitting said data, based on a predetermined condition, said data including, in addition to said appendix data, history data representing at least one of said plurality of data communication devices through which data has passed before said data arrives at said data communication device transmitting said inquiry data, said modifying appendix data including modifying said appendix data according to said history data.

28. The data communication method according to claim 27, wherein said history data representing the number of times said data has passed said data communication devices, wherein said modifying appendix data includes modifying said appendix data based on said number of times.

29. The data communication method according to claim 19, wherein said data being received via at least one of said plurality of data communication devices, said data including history data representing at least one of said plurality of data communication devices through which data has passed before said data arrives at the data communication device transmitting said inquiry data, said data communication method further comprising determining whether to execute a predetermined process or not in said data communication device based on whether said history data satisfies a predetermined condition, and controlling said data communication device according to said determination.

30. The data communication method according to claim 29, wherein said history data is data representing the number of times said data has passed said data communication devices, wherein said controlling the data communication device includes determining execution of said predetermined process when said number of times is a predetermined number.

31. The data communication method according to claim 19, further comprising preparing in advance an identification data to identify said data communication device, wherein said transmitting data includes transmitting data with identification data to said second data communication device, said data communication method further comprising displaying said received data when the identification data appended to the data received matches the identification data prepared in advance.

32. The data communication method according to claim 31, further comprising entering identification data to identify a data communication device to which data is to be transmitted.

33. The data communication method according to claim 19, wherein said storing data includes storing a plurality of said data, said data communication method further comprising selecting data from said plurality of data stored, wherein said transmitting data includes transmitting said data selected.

34. The data communication method according to claim 19, further comprising:

preparing appendix data, and appending appendix data prepared to said data, and storing said data with said appendix data when said data stored satisfies a predetermined condition.

35. The data communication method according to claim 21, wherein said data being received via at least one of said plurality of data communication devices, said data including history data representing a data communication device through which data has passed before said data arrives at said data communication device transmitting said inquiry data, said data communication method further comprising applying a predetermined process on said stored history data when said history data included in said data stored satisfies a predetermined condition.

36. The data communication method according to claim 35, wherein said applying a predetermined process includes initializing said stored history data when said history data included in said data stored satisfies a predetermined condition.

37. A computer-readable recording medium recorded with a program realizing a data communication method for data communication between a first data communication device and a plurality of data communication devices, said data communication method comprising:

receiving data at a first data communication device, storing the received data, transmitting an announce signal to said plurality of data communication devices within a communication range, upon receipt of a response to the announce signal from a second data communication device among said data communication devices, transmitting the stored data to the second data communication device, and upon transmission of the stored data, deleting the stored transmitted data, wherein said received data including appendix data stored so as to be displayed to a user of said second data communication device, said data communication method further comprising displaying said appendix data, and wherein said appendix data being data representing a virtual character, said data communication method further comprising modifying said appendix data so as to change the virtual character displayed at the displaying of appendix data.

38. The recording medium according to claim 37, said data communication method further comprising receiving reception complete data representing reception of said data from said second data communication device, wherein said deleting data includes deleting data transmitted to said second data communication device in response to reception of said reception complete data.

39. The recording medium according to claim 37, wherein said data communication method comprising transmitting inquire data inquiring about whether reception of said data is possible or not to said second data communication device, prior to transmitting said data, based on a predetermined condition, and preparing reception of said data in response to reception of said inquiry data.

40. The recording medium according to claim 39, wherein said data communication method further comprising switching an operation mode to a transmission mode transmitting data and to a reception mode receiving data, wherein said condition corresponds to storage of data to be transmitted to said second data communication device capable of communication therewith and the operation mode of said data communication device being a transmission mode.

41. The recording medium according to claim 39, wherein said data communication method further comprising preparing in advance identification data to identify said data communication device,
- said data being received via at least one of said plurality of data communication devices,
- said inquiry data including at least one identification data to identify a data communication device through which data has passed before said data arrives at the data communication device transmitting said inquiry data,
- wherein said preparing reception includes rejecting reception of data when there is identification data prepared in advance in the identification data included in said received inquiry data.

42. The recording medium according to claim 41, wherein said inquiry data including a predetermined number of identification data to identify a data communication device through which data has passed before said data arrives at the data communication device transmitting said inquiry data.

43. The recording medium according to claim 37, wherein said data communication method further comprising removing said appendix data from a transmission object to said second data communication device.

44. The recording medium according to claim 43, wherein said data communication method further comprising including again in said transmission object said appendix data removed from said transmission object.

45. The recording medium according to claim 37, wherein said data being received via at least one of said plurality of data communication devices,
- said data communication method further comprising transmitting inquiry data inquiring about whether reception of said data is possible or not to said second data communication device prior to transmitting said data, based on a predetermined condition,
- said data including, in addition to said appendix data, history data representing at least one of said plurality of data communication devices through which data has passed before said data arrives at said data communication device transmitting said inquiry data,
- said modifying appendix data including modifying said appendix data according to said history data.

46. The recording medium according to claim 45, wherein said history data representing the number of times said data has passed said data communication devices,
- wherein said modifying appendix data includes modifying said appendix data based on said number of times.

47. The recording medium according to claim 37, wherein said data being received via at least one of said plurality of data communication devices,
- said data includes history data representing at least one of said plurality of data communication devices through which data has passed before said data arrives at the data communication device transmitting said inquiry data,
- said data communication method further comprising determining whether to execute a predetermined process or not in said communication device based on whether said history data satisfies a predetermined condition or not, and controlling said data communication device according to said determination.

48. The recording medium according to claim 47, wherein said history data is data representing the number of times said data has passed said data communication devices,
- wherein said controlling the data communication device includes determining execution of said predetermined process when said number of times is a predetermined number.

49. The recording medium according to claim 37, wherein said data communication method further comprising preparing in advance an identification data to identify said data communication device,
- wherein said transmitting data includes transmitting data with identification data to said second data communication device,
- said data communication method further comprising displaying said received data when the identification data appended to the data received at the receiving of data matches the identification data prepared in advance.

50. The recording medium according to claim 49, wherein said data communication method further comprising entering identification data to identify a data communication device to which data is to be transmitted.

51. The recording medium according to claim 37, wherein said storing data includes storing a plurality of said data,
- said data communication method further comprising selecting data from said plurality of data stored at the storing of data,
- wherein said transmitting data includes transmitting said data selected.

52. The recording medium according to claim 37, said data communication method further comprising
- preparing appendix data, and
- appending appendix data prepared to said data, and storing said data with said appendix data when said data stored satisfies a predetermined condition.

53. The recording medium according to claim 39, wherein said data being received via at least one of said plurality of data communication devices,
- said data including history data representing a data communication device through which data has passed before said data arrives at the data communication device transmitting said inquiry data,
- said data communication method further comprising applying a predetermined process on said stored history data when said history data included in said data stored satisfies a predetermined condition.

54. The recording medium according to claim 53, wherein said applying a predetermined process includes initializing said stored history data when said history data included in said data stored satisfies a predetermined condition.

* * * * *